United States Patent
Adogla et al.

(10) Patent No.: US 12,481,795 B2
(45) Date of Patent: Nov. 25, 2025

(54) TECHNIQUES FOR VALIDATING CLOUD REGIONS BUILT AT A PREFAB FACTORY

(71) Applicant: Oracle International Corporation, Redwood Shores, CA (US)

(72) Inventors: Eden Adogla, Seattle, WA (US); Thomas Werner Kuehnel, Seattle, WA (US); John Ryan Gartrell, Seattle, WA (US)

(73) Assignee: Oracle International Corporation, Redwood City, CA (US)

( * ) Notice: Subject to any disclaimer, the term of this patent is extended or adjusted under 35 U.S.C. 154(b) by 293 days.

(21) Appl. No.: 18/122,675

(22) Filed: Mar. 16, 2023

(65) Prior Publication Data
US 2024/0311517 A1    Sep. 19, 2024

(51) Int. Cl.
*G06F 21/73* (2013.01)
*G06F 9/4401* (2018.01)
(Continued)

(52) U.S. Cl.
CPC ............ *G06F 21/73* (2013.01); *G06F 9/4416* (2013.01); *G06F 21/78* (2013.01); *H04L 9/0897* (2013.01)

(58) Field of Classification Search
CPC ........ G06F 21/73; G06F 9/4416; G06F 21/78; H04L 9/0897
(Continued)

(56) References Cited

U.S. PATENT DOCUMENTS

| | | |
|---|---|---|
| 1,316,822 A | 9/1919 | Yokich |
| 6,928,282 B2 | 8/2005 | Taniguchi |

(Continued)

FOREIGN PATENT DOCUMENTS

| | | |
|---|---|---|
| CN | 105227686 A | 1/2016 |
| CN | 106535548 A | 3/2017 |

(Continued)

OTHER PUBLICATIONS

International Application No. PCT/US2024/020248, International Search Report and Written Opinion mailed on Jul. 5, 2024, 12 pages.

(Continued)

*Primary Examiner* — Thanh T Le
(74) *Attorney, Agent, or Firm* — Kilpatrick Townsend & Stockton LLP

(57) ABSTRACT

Techniques are disclosed for validating a cloud region built at a prefab factory. A computing device of the cloud region can receive a network configuration from a manager service. The network configuration can correspond to a network topology of physical resources in the cloud region and can include a first identifier associated with a computing device, a second identifier associated with a neighboring computing device, and information associating the computing device with the neighboring computing device. The computing device can be configured for transmitting to a second data center and can boot into a test mode at the second data center and receive a new identifier from a server device. The computing device can verify the new identifier and send a validation request to the neighboring computing device. The computing device can validate a network connection to the neighboring computing device based on a response to the validation request.

20 Claims, 16 Drawing Sheets

(51) Int. Cl.
  *G06F 21/78* (2013.01)
  *H04L 9/08* (2006.01)
(58) Field of Classification Search
  USPC .......................................................... 726/26
  See application file for complete search history.

(56) References Cited

U.S. PATENT DOCUMENTS

| | | | |
|---|---|---|---|
| 7,278,273 | B1 | 10/2007 | Whitted et al. |
| 7,724,513 | B2 | 5/2010 | Coglitore et al. |
| 8,137,003 | B2 | 3/2012 | Shannon et al. |
| 8,143,521 | B2 | 3/2012 | Burek et al. |
| 8,737,090 | B2 | 5/2014 | Jai |
| 8,943,757 | B2 | 2/2015 | Parizeau et al. |
| 8,972,604 | B1 | 3/2015 | Ramsden-Pogue et al. |
| 9,176,744 | B2 | 11/2015 | Lee |
| 9,385,918 | B2 | 7/2016 | Civilini et al. |
| 9,426,036 | B1 | 8/2016 | Roy |
| 9,584,373 | B2 | 2/2017 | Schlansker et al. |
| 9,603,281 | B2 | 3/2017 | Crosby, Jr. |
| 9,813,302 | B2 | 11/2017 | Curtis et al. |
| 9,923,865 | B1 | 3/2018 | Wei et al. |
| 9,946,034 | B1 | 4/2018 | Eslick et al. |
| 10,205,701 | B1 | 2/2019 | Voss et al. |
| 10,243,785 | B1 | 3/2019 | Corrigan et al. |
| 10,243,790 | B2* | 3/2019 | Galliher, III ........ H04L 41/0806 |
| 10,420,248 | B1 | 9/2019 | Yu et al. |
| 10,674,625 | B1 | 6/2020 | Leung et al. |
| 10,819,677 | B2 | 10/2020 | Goelitz et al. |
| 10,880,218 | B2 | 12/2020 | Radlein et al. |
| 10,905,025 | B1 | 1/2021 | Thomas et al. |
| 10,965,525 | B1 | 3/2021 | Frink et al. |
| 11,006,001 | B1 | 5/2021 | Britt et al. |
| 11,301,407 | B2 | 4/2022 | Sen et al. |
| 11,316,822 | B1 | 4/2022 | Gawade et al. |
| 11,438,393 | B1 | 9/2022 | Tribble et al. |
| 11,451,447 | B1 | 9/2022 | Jangam et al. |
| 11,496,364 | B1* | 11/2022 | Mellquist ................ H04L 41/08 |
| 11,595,347 | B1 | 2/2023 | Shevade et al. |
| 11,824,735 | B1* | 11/2023 | Prateek ............... H04L 41/0806 |
| 11,853,802 | B1* | 12/2023 | Wei .................... G06F 9/45558 |
| 12,015,722 | B2 | 6/2024 | Jain et al. |
| 12,095,734 | B1 | 9/2024 | Engskow et al. |
| 2004/0228290 | A1* | 11/2004 | Graves .................... G06F 16/10 370/257 |
| 2005/0114507 | A1 | 5/2005 | Tarui et al. |
| 2008/0314979 | A1 | 12/2008 | Johnsen et al. |
| 2009/0198388 | A1 | 8/2009 | Hillis |
| 2009/0216920 | A1 | 8/2009 | Lauterbach et al. |
| 2011/0154320 | A1 | 6/2011 | Verma |
| 2012/0110055 | A1 | 5/2012 | Van Biljon et al. |
| 2012/0155027 | A1 | 6/2012 | Broome et al. |
| 2012/0317261 | A1 | 12/2012 | Ahmavaara |
| 2013/0007710 | A1 | 1/2013 | Vedula et al. |
| 2014/0082164 | A1 | 3/2014 | Niemoller et al. |
| 2014/0314099 | A1 | 10/2014 | Dress |
| 2015/0156122 | A1 | 6/2015 | Singh et al. |
| 2015/0248338 | A1* | 9/2015 | Klein .................. G06F 11/3688 714/37 |
| 2016/0248726 | A1 | 8/2016 | Kolesnik et al. |
| 2016/0248732 | A1 | 8/2016 | Kolesnik et al. |
| 2017/0026226 | A1* | 1/2017 | Grussling ........... H04L 41/0654 |
| 2017/0104637 | A1* | 4/2017 | Gianrossi ................ H04L 43/50 |
| 2017/0111389 | A1 | 4/2017 | Kasman et al. |
| 2017/0163560 | A1 | 6/2017 | Siemssen |
| 2017/0208140 | A1 | 7/2017 | Choi et al. |
| 2017/0344584 | A1 | 11/2017 | Parappalliyalil et al. |
| 2017/0374088 | A1 | 12/2017 | Pappu et al. |
| 2018/0082076 | A1 | 3/2018 | Murray |
| 2018/0152503 | A1 | 5/2018 | Holgers et al. |
| 2018/0176130 | A1 | 6/2018 | Banerjee et al. |
| 2018/0234407 | A1* | 8/2018 | Li ........................ H04L 9/3226 |
| 2019/0182207 | A1 | 6/2019 | Tsirkin |
| 2019/0208290 | A1 | 7/2019 | Olson et al. |
| 2019/0213044 | A1* | 7/2019 | Cui ....................... G06F 9/5072 |
| 2019/0235851 | A1 | 8/2019 | Vergara |
| 2019/0238498 | A1 | 8/2019 | Cleary et al. |
| 2019/0253410 | A1 | 8/2019 | Joyner et al. |
| 2020/0021556 | A1 | 1/2020 | Goelitz et al. |
| 2020/0053065 | A1 | 2/2020 | Wisniewski et al. |
| 2020/0106669 | A1 | 4/2020 | Dhillon et al. |
| 2020/0153740 | A1 | 5/2020 | Singh et al. |
| 2020/0162317 | A1 | 5/2020 | Devireddy |
| 2020/0186494 | A1 | 6/2020 | X et al. |
| 2020/0205310 | A1 | 6/2020 | Rogers |
| 2021/0119960 | A1 | 4/2021 | Sinha et al. |
| 2021/0392041 | A1* | 12/2021 | Ranjan ...................... G06F 8/61 |
| 2022/0024048 | A1 | 1/2022 | Ambrus et al. |
| 2022/0029794 | A1 | 1/2022 | Malhotra et al. |
| 2022/0158975 | A1 | 5/2022 | Brecl et al. |
| 2022/0191163 | A1 | 6/2022 | Loefstrand et al. |
| 2022/0217057 | A1 | 7/2022 | Schumaker |
| 2022/0231915 | A1 | 7/2022 | Maniyar et al. |
| 2022/0385623 | A1 | 12/2022 | Henry et al. |
| 2022/0398118 | A1* | 12/2022 | Akula ................. G06F 9/45558 |
| 2023/0018535 | A1 | 1/2023 | Chawla et al. |
| 2023/0086281 | A1 | 3/2023 | Kaidi |
| 2023/0108661 | A1 | 4/2023 | Adogla et al. |
| 2023/0153094 | A1 | 5/2023 | Cain, Jr. et al. |
| 2023/0216828 | A1 | 7/2023 | Singh et al. |
| 2023/0254287 | A1 | 8/2023 | Belleau |
| 2023/0385228 | A1 | 11/2023 | Olson et al. |
| 2023/0396590 | A1 | 12/2023 | Adogla |
| 2024/0015136 | A1 | 1/2024 | Asveren et al. |
| 2024/0020175 | A1 | 1/2024 | Barsalou et al. |
| 2024/0022542 | A1 | 1/2024 | Liu et al. |
| 2024/0097918 | A1 | 3/2024 | Sharma et al. |
| 2024/0098504 | A1 | 3/2024 | Demonget et al. |
| 2024/0129317 | A1 | 4/2024 | Addaguduru et al. |
| 2024/0388567 | A1 | 11/2024 | Brecl et al. |

FOREIGN PATENT DOCUMENTS

| | | |
|---|---|---|
| CN | 112188788 A | 1/2021 |
| CN | 113873053 A | 12/2021 |
| CN | 215526574 U | 1/2022 |
| EP | 1081921 B1 | 1/2006 |
| EP | 2854080 A1 | 4/2015 |
| EP | 3275143 B1 | 12/2019 |
| WO | 2009109684 A1 | 9/2009 |
| WO | 2019191401 A1 | 10/2019 |
| WO | 2020018582 A1 | 1/2020 |
| WO | 2023154680 A1 | 8/2023 |

OTHER PUBLICATIONS

International Application No. PCT/US2024/020250, International Search Report and Written Opinion mailed on Jun. 26, 2024, 12 pages.
International Application No. PCT/US2024/020255, International Search Report and Written Opinion mailed on Jul. 3, 2024, 12 pages.
International Application No. PCT/US2024/020258, Invitation to Pay Additional Fees and, Where Applicable, Protest Fee Mailed on Jul. 3, 2024, 8 pages.
International Application No. PCT/US2024/020261, International Search Report and Written Opinion mailed on Jul. 3, 2024, 11 pages.
U.S. Appl. No. 18/122,677, Non-Final Office Action mailed on Dec. 19, 2024, 15 pages.
International Application No. PCT/US2024/020258, International Search Report and Written Opinion mailed on Aug. 26, 2024, 16 pages.
International Application No. PCT/US2024/035410, International Search Report and Written Opinion mailed on Oct. 7, 2024, 23 pages.
U.S. Appl. No. 18/122,674, Non-Final Office Action mailed on Feb. 25, 2025, 17 pages.
U.S. Appl. No. 18/215,632, Non-Final Office Action mailed on Mar. 24, 2025, 18 pages.
U.S. Appl. No. 18/382,885, Non-Final Office Action mailed on Dec. 18, 2024, 17 pages.

(56) References Cited

OTHER PUBLICATIONS

U.S. Appl. No. 18/520,510, Notice of Allowance mailed on Apr. 21, 2025, 17 pages.
Mastenbroek et al., OpenDC 2.0: Convenient Modeling and Simulation of Emerging Technologies in Cloud Datacenters, Institute of Electrical and Electronics Engineers/Association for Computing Machinery 21st International Symposium on Cluster, Cloud and Internet Computing, May 10, 2021, 10 pages.
International Application No. PCT/US2024/056694, International Search Report and Written Opinion mailed on Feb. 11, 2025, 16 pages.
7220 Interconnect Router for Data Center Fabric, Nokia, Available Online at: https://www.nokia.com/networks/data-center/data-center-fabric/7220-interconnect-router/, Accessed from Internet on May 20, 2022, 3 pages.
90 kW, Tier II, Direct Expansion, 142.1 m2 , All-In-One Prefab Data Center Module—Busway or PDU, Schneider Electric, Available Online at: https://download.schneider-electric.com/files?p_Doc_Ref=RD84DSR2_EN, Sep. 2018, pp. 1-7.
Adding or Changing Name Servers and Glue Records for a Domain, Available online at: https://docs.aws.amazon.com/Route53/latest/DeveloperGuide/domain-name-servers-glue-records.html, Accessed from Internet May 2, 2022, 5 pages.
All-in-One Container, Schneider Electric India, Available Online at: https://www.se.com/in/en/product-range/62320-allinone-container/?parent-subcategory-id=7570#overview, Accessed from Internet on May 3, 2022, 3 pages.
Cable and Pipe Seals for Data Centers, Roxtec, Available Online at: https://www.roxtec.com/uk/industries/infrastructure/data-centers/, Accessed from Internet on May 20, 2022, 14 pages.
Cable Management for Data Centres, Etech Components, Available Online at: https://etechcomponents.com/cable-management-for-data-centres/, Dec. 10, 2021, 8 pages.
Cable Trough System, Etech Components, Available Online at: https://etechcomponents.com/product_categories/cable-trough-system/?cn-reloaded=1, Accessed from Internet on May 20, 2022, 8 pages.
Cisco ACI Multi-Site Architecture: White Paper, Available Online at: https://www.cisco.com/c/en/us/solutions/collateral/data-center-virtualization/application-centric-infrastructure/white-paper-c11-739609.html, 2021, pp. 1-140.
Cisco UCS 6400 Series Fabric Interconnects, Data Sheet, Cisco Public, Available Online at: https://www.cisco.com/c/en/us/products/collateral/servers-unified-computing/datasheet-c78-741116.html, Accessed from Internet on May 3, 2022, 5 pages.
Cisco UCS Fabric Interconnects and Fabric Extenders, Cisco, Available Online at: https://www.cisco.com/c/en/us/products/servers-unified-computing/fabric-interconnects.html, Accessed from Internet on May 3, 2022, 2 pages.
Configure a Custom Domain Name for your Azure API Management Instance, Available online at: https://docs.microsoft.com/en-us/azure/api-management/configure-custom-domain?tabs=custom, Apr. 28, 2022, 8 pages.
Configuring DNS Server Settings for a Data Center, Available online at: https://sort.veritas.com/public/documents/ITRP/1.0/windowsandunix/productguides/html/deployment/ch06s07s01.htm , Accessed from Internet May 2, 2022, 2 pages.
Creating an Edge-Optimized Custom Domain Name, Available online at: https://docs.aws.amazon.com/apigateway/latest/developerguide/how-to-edge-optimized-custom-domain-name.html, Accessed from Internet May 2, 2022, 7 pages.
Data Center Manager, Honeywell Building Technologies, Available Online at: https://buildings.honeywell.com/us/en/industries/data-centers/honeywell_data_center_manager, Accessed from Internet on May 20, 2022, 5 pages.
Data Center Solutions and Networks Schneider Electric India, Available Online at: https://www.se.com/in/en/work/solutions/for-business/data-centers-and-networks/, Accessed from Interneton May 20, 2022, 7 pages.
Data Centers, Honeywell Building Technologies, Available Online at: https://buildings.honeywell.com/us/en/industries/data-centers, Accessed from Internet on May 20, 2022, 5 pages.
Data Centers: Our Controls, Aws, Available Online at: https://aws.amazon.com/compliance/data-center/controls/, Accessed from Internet on May 20, 2022, pp. 1-8.
EcoStruxure Data Center Reference Designs, Schneider Electric Global, Available Online at: https://www.se.com/ww/en/work/solutions/for-business/data-centers-and-networks/reference-designs/, Accessed from Internet on May 20, 2022, pp. 1-5.
EcoStruxure Data Centre Solutions, Schneider Electric India, Available Online at: https://www.se.com/in/en/work/products/master-ranges/ecostruxure-data-center-solutions/, Accessed from Internet on May 20, 2022, pp. 1-6.
EcoStruxure IT, Schneider Electric, Available Online at: https://ecostruxureit.com/, Accessed from Internet on May 20, 2022, 4 pages.
FusionDC1000A Prefabricated All-In-One Data Center, Huawei Enterprise, Available Online at: https://e.huawei.com/in/products/network-energy/dc-facilities/ids1000-a, Accessed from Internet on May 20, 2022, 6 pages.
FusionDC1000B Prefabricated Modular Data Center (Small- and Medium-Sized), Huawei Enterprise, Available Online at: https://e.huawei.com/in/products/network-energy/dc-facilities/ids1000-b, Accessed from Internet on May 5, 2022, pp. 1-5.
Hybrid Cloud Data Center, IBM, Available Online at: https://www.ibm.com/za-en/services/business-continuity/data-center, Accessed from Internet on May 20, 2022, pp. 1-7.
IBM Cloud Foundry Migration Runtime UI SSL Certificate Update and Rotation, Available online at: https://www.ibm.com/docs/en/cfmr?topic=guide-ssl-certificate-update-rotation, Sep. 17, 2021, 2 pages.
IManager NetEco6000 DCIM+ Solution, Huawei Enterprise, Available Online at: https://e.huawei.com/in/products/network-energy/dc-facilities/neteco6000, Accessed from Internet on May 5, 2022, 3 pages.
Introducing the Microsoft Azure Modular Datacenter, Available Online at: https://azure.microsoft.com/en-in/blog/introducing-the-microsoft-azure-modular-datacenter/, Oct. 20, 2020, 6 pages.
Is It Possible to Have One SSL Certificate for Multiple Domains, Available online at: https://sectigostore.com/page/one-ssl-certificate-for-multiple-domains/, Accessed from Internet May 2, 2022, 7 pages.
ManageOne Data Center Management, Available Online at: https://carrier.huawei.com/en/products/IT/cloud-computing/manageone, Accessed from Internet on May 20, 2022, pp. 1-3.
Managing Google EKM Endpoints, Available online at: https://thalesdocs.com/ctp/cm/2.7/admin/cckm_ag/ekm/managing_ekm_endpoints/index.html, Accessed from Internet May 2, 2022, 12 pages.
Mobile Data Center, Conteg, Available Online at: https://www.conteg.com/mobile-data-center, Accessed from Internet on May 20, 2022, 4 pages.
Modular Data Centers for Efficient Operations, Schneider Electric Indian, Available Online at: https://www.se.com/in/en/work/solutions/for-business/data-centers-and-networks/modular/, Accessed from Internet on May 20, 2022, pp. 1-8.
Modular Datacenter Overview, Available Online at: https://docs.microsoft.com/en-us/azure-stack/mdc/mdc-overview, Mar. 1, 2022, 4 pages.
Multiple SSL Certificates for a Single Domain on Different Servers, Server Fault, Available online at: https://serverfault.com/questions/525581/multiple-ssl-certificates-for-a-single-domain-on-different-servers, Accessed from Internet May 2, 2022, 3 pages.
Next-Generation Data Center Interconnect Powered by the Pluribus Adaptive Cloud Fabric, Pluribus Networks, Available Online at: https://i.dell.com/sites/csdocuments/Product_Docs/en/dell-pluribus-nextgen-dci-so-042518.pdf, Accessed from Internet on May 20, 2022, pp. 1-5.
Prefabricated Data Center, Vertiv, Available Online at: https://www.vertiv.com/en-asia/solutions/prefabricated-data-center/, Accessed from Internet on May 20, 2022, pp. 1-8.

(56) References Cited

OTHER PUBLICATIONS

Prefabricated Data Center Brochure, Available Online at: https://www.vertiv.com/4994d7/globalassets/shared/vertiv-prefabricated-data-center-brochure.pdf, Accessed from Internet on May 20, 2022, 12 pages.
Prefabricated Data Center: Integral Systems Test Service for IT Module, Schneider Electric Services, Available Online at: https://www.se.com/in/en/download/document/SPD_SSAO-A3VLV3_EN, Oct. 16, 2017, 2 pages.
Prefabricated Modular & Mobile Data Centre, Available Online at: https://www.mobiledatacentre.com/prefabrication-construction-applications/mobile-data-centre/, Accessed from Internet on May 20, 2022, 5 pages.
Prefabricated Modular Data Center—Add Data Center Capacity Where and When You Need It, IBM Global Technology Services, Available Online at: https://www.ibm.com/downloads/cas/YXKNDQAO, Sep. 2014, 12 pages.
Ramos Plus, Conteg, Available Online at: https://www.conteg.com/products/ramos-plus, Accessed from Internet on May 20, 2022, 15 pages.
Redirecting Old Domain to New Domain—Google SSL Warning, Available online at: https://webmasters.stackexchange.com/questions/133635/redirecting-old-domain-to-new-domain-google-ssl-warning, Accessed from Internet May 2, 2022, 3 pages.
Schneider 3D Pre Fab Structure Tour, Available Online at: https://apps.kaonadn.net/6819002/SchneiderPrefab/index.html, Accessed from Internet on May 20, 2022, 1 page.
Schneider Electric EcoStruxureTM Modular Data Centers, Schneider Electric, Available Online at: https://download.schneider-electric.com/files?p_enDocType=Catalog&p_File_Name=EcoStruxure+Modular+Data+Centers+Brochure+ROW+Rev+4.pdf&p_Doc_Ref=Modular_Overview_Catalog_EN, Accessed from Internet on May 20, 2022, 2 pages.
Transform Maintenance into Uptime Strategy, Available Online at: https://buildings.honeywell.com/content/dam/hbtbt/en/documents/downloads/HW-BR-DigitizedMaintenance.pdf, 2021, 4 pages.
Transforming Data Centers into Open Interconnection Fabrics, DataCenter News, Available Online at: https://datacenternews.asia/story/transforming-data-centers-open-interconnection-fabrics, Mar. 10, 2017, pp. 1-3.
What is a Data Center Fabric?, Juniper Networks, Available Online at: https://www.juniper.net/us/en/research-topics/what-is-data-center-fabric.html, Accessed from Internet on May 3, 2022, 4 pages.
Your Data Center Your Rules, Honeywell Data Center Manager, Available Online at: https://buildings.honeywell.com/content/dam/hbtbt/en/documents/downloads/Honeywell-Data-Center-Manager-BR.pdf, 2021, 4 pages.
Andreyev, Introducing Data Center Fabric, the Next-Generation Facebook Data Center Network, Data Center Engineering, Networking & Traffic, Production Engineering, Available Online at: https://engineering.fb.com/2014/11/14/production-engineering/introducing-data-center-fabric-the-next-generation-facebook-data-center-network/, Nov. 14, 2014, 10 pages.
Andreyev et al., Reinventing Facebook's Data Center Network, Data Center Engineering, Networking & Traffic, Available Online at: https://engineering.fb.com/2019/03/14/data-center-engineering/f16-minipack/, Mar. 14, 2019, 18 pages.
Dementyev et al., Zero Downtime Rebranding—Martian Chronicles, Evil Martians' Team blog, Available Online at: https://evilmartians.com/chronicles/zero-downtime-rebranding, Nov. 27, 2017, 14 pages.
Gao et al., DRAF: A Low-Power DRAM-Based Reconfigurable Acceleration Fabric, ACM SIGARCH Computer Architecture News, vol. 44, No. 3, Available Online at: https://dl.acm.org/doi/pdf/10.1145/3007787.3001191, Jun. 18, 2016, pp. 506-518.
Yirka, Microsoft Debuts Portable Data Center to Bring Cloud Computing to Remote Environments, TechXplore, Available Online at: https://techxplore.com/pdf522492993.pdf, Oct. 21, 2020, 2 pages.
Google Cloud Security Whitepapers Google Cloud Infrastructure Security Design Overview, Available online at: https://services.google.com/fh/files/misc/security_whitepapers_march2018.pdf, Mar. 2018, pp. 1-97.
U.S. Appl. No. 18/122,676, Non-Final Office Action mailed on Jun. 23, 2025, 34 pages.
U.S. Appl. No. 18/122,677, Notice of Allowance mailed on Aug. 5, 2025, 8 pages.
U.S. Appl. No. 18/215,632, Notice of Allowance mailed on Aug. 13, 2025, 8 pages.
U.S. Appl. No. 18/382,885, Final Office Action mailed on Jun. 2, 2025, 10 pages.
International Application No. PCT/US2025/011497, International Search Report and Written Opinion mailed on Apr. 22, 2025, 12 pages.
International Application No. PCT/US2025/015766, International Search Report and Written Opinion mailed on May 7, 2025, 12 pages.

* cited by examiner

TECHNIQUES FOR VALIDATING CLOUD REGIONS BUILT AT A PREFAB FACTORY

CROSS REFERENCES TO RELATED APPLICATIONS

The present application is related to the following applications, the entire contents of which are incorporated herein by reference for all purposes:

(1) U.S. Non-Provisional application Ser. No. 18/122,674, filed on the same day, entitled "TECHNIQUES FOR BUILDING CLOUD REGIONS AT A PREFAB FACTORY";

(2) U.S. Non-Provisional application Ser. No. 18/122,676, filed on the same day, entitled "STATIC NETWORK FABRIC AT A PREFAB FACTORY";

(3) U.S. Non-Provisional application Ser. No. 18/122,677, filed on the same day, entitled "MOBILE PREFAB FACTORY FOR BUILDING CLOUD REGIONS"; and (4) U.S. Non-Provisional application Ser. No. 18/122,678, filed on the same day, entitled "TECHNIQUES FOR A CABLE TERMINATION PROTECTION APPARATUS IN A PREFAB FACTORY".

BACKGROUND

A cloud infrastructure provider may operate one or more data centers in geographic areas around the world. A "region" is a logical abstraction around a collection of the computing, storage, and networking resources of the data centers of a given geographical area that are used to provide the cloud computing infrastructure. Building new regions can include provisioning the computing resources, configuring infrastructure, and deploying code to those resources, typically over network connections to the data centers. However, building regions with physical resources located at the final destination data center sites requires significant preparation work at the data centers that can complicate the logistics and scheduling of completing the building of a region.

BRIEF SUMMARY

Embodiments of the present disclosure relate to automatically building a region using a prefab factory. A prefab factory may be a facility dedicated to configuring computing devices, networking devices, and other physical resources for delivery to a destination site (e.g., a destination region—one or more data centers in a geographic area, a customer facility, etc.). Operations for building a region can include bootstrapping (e.g., provisioning and/or deploying) resources (e.g., infrastructure components, artifacts, etc.) for any suitable number of services available from the region when delivered to the destination. Once the physical resources have been configured at the prefab factory, they may be shipped to the destination site, installed at the destination data center, and have final configurations and other software resources deployed to the physical resources. Resources used for bootstrapping (e.g., software artifacts, software images, etc.) may be provided in a bootstrapping environment in an existing region (e.g., one or more data centers of a host region). The host region can be selected based on network proximity to the prefab factory, and in a complimentary fashion, the prefab factory may be sited to have high performance network connectivity to one or more host regions to support the bootstrapping environment. Building the region may be orchestrated by one or more cloud-based services that can manage the inventory of physical computing devices used to build regions in the prefab factory, generate and specify the configurations of regions to be built in the prefab factory, manage the bootstrapping of the regions, configure the regions for transmission to a destination site, and test and verify the physical resources after the physical resources have been installed at the destination site. A prefab region may be built to meet a specific customer's configuration preferences (built-to-order) or built to a common specification that may be further customized during installation at a specific customer's site (built-to-stock).

One embodiment is directed to a computer-implemented method that can include receiving a network configuration at a computing device of a region being built in a first data center (e.g., a prefab factory). The network configuration may be received from a manager service executing in a computing environment of a cloud service provider. The network configuration can correspond to a network topology of physical resources in a first data center and can include a first identifier associated with the computing device, a second identifier associated with a neighboring computing device, and information associating the computing device with the neighboring computing device. In response to an indication from the manager service, the computing device may be configured for transmitting to a second data center. After the computing device and the other physical resources have been transported to the second data center, the computing device may boot into a test mode at the second data center. The computing device can receive a new identifier from a server device at the second data center and verify the new identifier by comparing the new identifier with the first identifier. The computing device can send a validation request to the neighboring computing device. The validation request may be sent according to the second identifier associated with the neighboring computing device. The computing device can then validate a network connection to the neighboring computing device based on a response to the validation request.

Another embodiment is directed to a computing system comprising one or more processors and instructions that, when executed by the one or more processors, cause the computing system to perform the method described above.

Still another embodiment is directed to a non-transitory computer-readable medium storing computer-executable instructions that, when executed by one or more processors of a computing system, cause the computing system to perform the method described above.

BRIEF DESCRIPTION OF DRAWINGS

To easily identify the discussion of any particular element or act, the most significant digit or digits in a reference number refer to the figure number in which that element is first introduced.

DETAILED DESCRIPTION OF DRAWINGS

Figure 1:
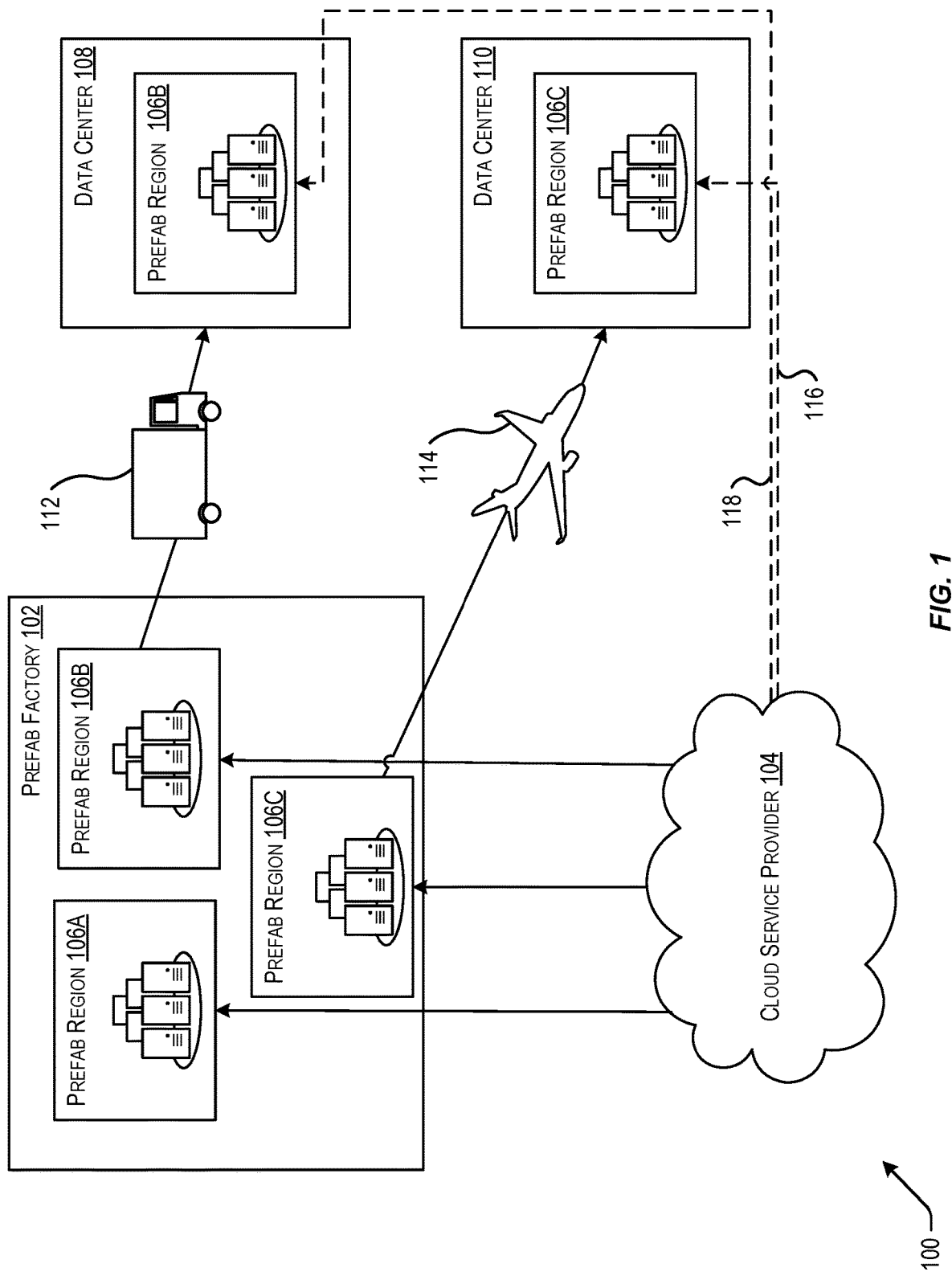
FIG. 1 is a block diagram illustrating a prefabrication factory for building regions and preparing the region computing devices for transportation to target data centers, according to at least one embodiment.

Example Automated Data Center Build (Region Build) Infrastructure

The adoption of cloud services has seen a rapid uptick in recent times. Various types of cloud services are now provided by various different cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure, and which are used to provide a cloud service to a customer, are separate from the customer's own on-premises servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, a government entity, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors, bare-metal computers), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center leads to shorter latency resulting in more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers)) and configuring it to provide cloud services in a region is sometimes also referred to as building a region. The term "region build" is used to refer to building one or more data centers in a region. Building a region involves provisioning or creating a set of new resources that are needed or used for providing a set of services that the data center is configured to provide. The end result of the region build process is the creation of a region, where the data center, together with the contained hardware and software resources, is capable of providing a set of services intended for that region and includes a set of resources that are used to provide the set of services.

Building a new region is a very complex activity requiring extensive coordination between various bootstrapping activities. At a high level, this involves the performance and coordination of various tasks such as: identifying the set of services to be provided by the data center; identifying various resources that are needed for providing the set of services; creating, provisioning, and deploying the identified resources; wiring the underlying hardware properly so that they can be used in an intended manner; and the like. Each of these tasks further have subtasks that need to be coordinated, further adding to the complexity. Due to this complexity, presently, the building of a region involves several manually initiated or manually controlled tasks that require careful manual coordination. As a result, the task of building a new region (i.e., building one or more data centers in a region and configuring the hardware and software in each data center to provide the requisite cloud services) is very time consuming. It can take time, for example many months, to build a region. Additionally, the process is very error prone, sometimes requiring several iterations before a desired configuration of the region is achieved, which further adds to the time taken to build a region (e.g., deploy hardware and software resources). These limitations and problems severely limit a CSP's ability to grow computing resources in a timely manner responsive to increasing customer needs.

Recent innovations allow CSPs to reduce build time, reduce computing resource waste, and reduce risk related to building a region. A CSP may employ an orchestration service to bootstrap services into a new region. The orchestration service may be a cloud-based service hosted within a separate region (e.g., an orchestration region) from the target region. To bootstrap services into the target region, the orchestration service can create a bootstrapping environment to host instances of one or more cloud services. The orchestration service can then use the services in the bootstrapping environment to support the deployment of services into the target region.

Even more recent innovations allow CSPs to centralize the region build operations to one or more facilities that can act as "factories" to produce partially or fully configured physical infrastructure for subsequent delivery to a destination site. Instead of waiting for the construction of a target region data center and the installation of physical components (e.g., servers, network switches, power supply, etc.) at the data center before bootstrapping the services into the target region, a CSP can build regions in a prefab factory, ship the configured physical components, like racks, to the destination data center, and then finalize and verify the components of the region once the racks arrive at the destination site. The prefab factory is capable of building multiple regions simultaneously. Each region being built at the prefab factory can have separate configurations, network topologies, and services. By building the regions at a prefab factory, the complexity of scheduling and logistics related to preparing the destination facility, delivering physical components to the destination facility, and managing bootstrapping resources within the cloud services can be greatly reduced, since the regions can be built in advance and maintained until the destination site is ready.

A prefab factory can also be used to build computing components to be integrated into on-premises solutions for customers, for example, when the customer controls and manages its own data center environment.

The centralized prefab factory supports additional innovations for building regions in an efficient manner. The prefab factory can include a static network fabric consisting of networking infrastructure (e.g., network switches, routers, cabling, etc.) designed to support any potential configuration of region components built in the factory. As such, the static network fabric can allow for physical resources of the region to be placed in the factory and quickly connected to the existing network fabric. Regions with different network topologies can also be quickly connected to the same network fabric according to connection plans that match the static network fabric with the physical components of the region. The static network fabric can reduce the complexity of network connections of the regions within the factory, increasing the speed at which the region components are installed in the factory and removed from the factory in preparation for transmission. In a complementary manner, because the static network fabric provides a set of dedicated network connections for devices at different locations within the prefab factory, these connections can be protected by a cable terminal protection apparatus (CTPA) that is designed to accommodate each possible network connection (e.g., Ethernet, fiber optic, etc.) that can be used to connect the region to the factory network.

The present disclosure is directed to a prefab factory in which automated region builds are performed using one or more prefab services. A prefab manager service can orchestrate the overall building of a region at the prefab factory. The manager service can work in conjunction with the one or more additional prefab services to manage the inventory of physical components used to construct the region at the prefab factory, configure the network (e.g., endpoints, network topology, addresses and/or other identifiers of the components within the region), bootstrapping services onto the region infrastructure, preparing the components for transmission of the region (including encrypting data volumes to provide security during transit), verifying the region after delivery to and installation at the destination site, and finalizing the configuration of the region, including performing any remaining bootstrapping or updating operations for the services deployed to the region infrastructure previously at the prefab factory. In addition, the present disclosure describes features of the prefab factory itself that improve the automated region build activities therein, including a static network fabric of the prefab factory that is configured to support any potential region network topology without needing ad hoc modifications, as well as dedicated CTPAs to improve the performance of the static network fabric. Finally, this disclosure also describes a mobile prefab factory that can perform some, any, or all of the operations related to automated region build in the prefab factory while the region components are in transit to the destination site.

Certain Definitions

A "region" is a logical abstraction corresponding to a collection of computing, storage, and networking resources associated with a geographical location. A region can include any suitable number of one or more execution targets. A region may be associated with one or more data centers. A "prefab region" describes a region built in a prefab factory environment prior to delivery to the corresponding geographical location. In some embodiments, an execution target could correspond to the destination data center as opposed to the prefab factory data center.

An "execution target" refers to a smallest unit of change for executing a release. A "release" refers to a representation of an intent to orchestrate a specific change to a service (e.g., deploy version 8, "add an internal DNS record," etc.). For most services, an execution target represents an "instance" of a service or an instance of change to be applied to a service. A single service can be bootstrapped to each of one or more execution targets. An execution target may be associated with a set of devices (e.g., a data center).

"Bootstrapping" a single service is intended to refer to the collective tasks associated with provisioning and deployment of any suitable number of resources (e.g., infrastructure components, artifacts, etc.) corresponding to a single service. Bootstrapping a region is intended to refer to the collective of tasks associated with each of the bootstrap of each of the services intended to be in the region.

A "service" refers to functionality provided by a set of resources, typically in the form of an API that customers can invoke to achieve some useful outcome. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component or a Kubernetes engine cluster, this may include software (e.g., an application), configuration information (e.g., a configuration file), credentials, for an infrastructure component, or the like.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" or "software resource" after provisioning and deployment has concluded. Examples of resources may include, but are not limited to, virtual machines, databases, object storage, block storage, load balancers, and the like.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPSec Tunnel VPN). Certain essential core services (or "seed" services) like a deployment orchestrator, a public key infrastructure (PKI) service, a dynamic host configuration protocol service (DHCP), a domain name service (DNS), and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. These services can be staged and tested in the ViBE prior to the prefab region (e.g., the target region) being available.

A "Manager Service" may refer to a service configured to manage provisioning and deployment operations for any suitable number of services as part of a prefab region build. A manager service may be used in conjunction with one or more additional prefab services to orchestrate a region build in a prefab factory as well as for managing how the prefabbed region is installed and configured at the destination data center after it is built and shipped over. The manager service and other prefab services may be hosted in an existing region of a CSP.

A "host region" refers to a region that hosts a virtual bootstrap environment (ViBE). A host region may be used to bootstrap a ViBE.

A "target region" refers to a region under build in the prefab factory. During a prefab region build, the target region is associated with physical space, power, and cooling provided by the prefab factory. After bootstrapping, once the prefabbed region has been shipped to the destination data center, the prefabbed region is associated with the destination data center into which it gets installed.

Prefab Region Build

In some examples, techniques for building a region at a prefab factory are described herein. Such techniques, as described briefly above, can include one or more prefab services (e.g., manager service, network service, inventory service, testing service, deployment orchestration system) hosted by a CSP that can manage bootstrapping (e.g., provisioning and deploying software to) infrastructure components for one or more regions within the prefab factory. The prefab factory may be configured to support multiple region builds simultaneously. For example, physical resources (e.g., server racks, network switches, etc.) of a first prefab region may be installed at one location in the prefab factory while physical resources of a second prefab region may be installed at a second location in the prefab factory. Each prefab region can be connected to a dedicated network fabric of the prefab factory to provide networking connections to each prefab region independently, so that each region can communicate with the prefab services and/or other cloud services to support the region build. Based on a build request (a specification of the region, e.g., a number of server racks for the region, a number of computing devices, a number and type services to be hosted by the region, a network topology of the region, etc.), the prefab services can generate instructions to install (e.g., by factory personnel) the corresponding physical infrastructure in the prefab factory, which can include networking the physical devices together on their racks, positioning the racks at locations in the prefab factory, and connecting the devices to the static network fabric of the prefab factory. The manager service can then orchestrate the provisioning of the region infrastructure and deployment of software resources to the prefab region infrastructure, configure the prefab region for transmission, manage (e.g., schedule and monitor) the transmission of the prefab region, and perform testing and verification of the prefab region once it reaches its destination site.

The prefab factory can centralize the region build process to provide more efficient use of computing and networking resources that support region build. For example, the prefab factory may be sited "close" (e.g., with low-latency and high data rate networking connections) to a host region that includes the prefab services and/or a ViBE. Multiple regions may be built using the improved performance of the network connection to the host region, avoiding potential poor performance when performing a region build to a newly constructed data center site for typical region build. The prefab factory also provides improved physical and computational security for the devices during region build, as the CSP can control the prefab factory and the network connections therein.

In addition, the prefab factory improves the management of the inventory of physical components. The manager service can determine which computing devices are needed for a particular region build, which may be stored at or near the prefab factory. As regions are built and shipped, infrastructure for new regions can be quickly moved into the prefab factory and installed, increasing efficiency.

Turning now to the figures, FIG. 1 is a block diagram illustrating a prefabrication system 100 including a prefab factory 102 for building regions (e.g., Prefab Region 106A, Prefab Region 106B, Prefab Region 106C) and preparing the region computing devices for transmission to target data centers (e.g., data center 108, data center 110), according to at least one embodiment. Each region being built in the prefab factory 102 can include one or more devices that form the computing environment of a data center. The prefab factory 102 can be used to build multiple regions simultaneously. For example, prefab factory 102 can build all of Prefab Region 106A, Prefab Region 106B, and Prefab Region 106C at the same time. In some examples, the devices of a region may be installed and staged in the prefab factory 102 prior to beginning infrastructure provisioning and software deployment operations.

The prefab factory 102 can be a facility similar to a data center, including sufficient power, cooling, and networking infrastructure to support building one or more regions. The prefab factory 102 may be located in proximity to existing computing infrastructure of a CSP (e.g., CSP 104). For example, CSP 104 can operate existing data centers for one or more regions. The prefab factory 102 can be located close to or even adjacent to an existing data center of a host region to provide high data rate network connections between the cloud services of the CSP and the computing devices of the regions being built in the prefab factory 102. Additionally or alternatively, the prefab factory 102 can be located to improve logistical operations including shipping of regions to destination data centers.

A prefab region being built in the prefab factory 102 can include any suitable number of physical resources, including computing devices (e.g., servers, racks of multiple servers, etc.), storage (e.g., block storage devices, object storage devices, etc.), networking devices (e.g., switches, routers, gateways, etc.), and the like. Each region may have different physical resources according to the specific requirements of the destination region and data centers. For example, Prefab Region 106A may include 100 racks each having 40 computing devices, while Prefab Region 106B may include 20 racks each having 30 computing devices. Each rack of computing devices can include one or more networking devices communicatively connected to the server devices on the rack and configured to connect to networking infrastructure of the prefab factory 102 to form a network with other computing devices of the prefab region. Each rack can also include power supplies and cooling devices to support the operation of the computing devices on the racks.

The prefab factory 102 can include any suitable number of networking devices to support the installation and connection of the one or more computing devices of the prefab regions being built. For example, the prefab factory 102 can include any suitable number of leaf and spine switches to support the connection of computing devices on multiple racks to form the network of a prefab region. Similarly, the prefab factory 102 can include network cabling installed in the facility that can provide network connections to the networking infrastructure of the prefab factory 102. The network cabling may be positioned to terminate at locations within the prefab factory 102 where racks of computing devices for the prefab regions may be installed during region build operations. Additional details about the networking infrastructure and configuration of the prefab factory are provided below with respect to FIGS. 9-11.

The prefab factory 102 may be connected over one or more networks to services provided by CSP 104. During region build operations, CSP 104 can provision infrastructure components on the physical resources of the prefab regions and deploy software resources, configurations, and/or other artifacts to the provisioned infrastructure components. For example, CSP 104 can provision the computing devices of Prefab Region 106A to host one or more virtual machines, provide hostnames, network addresses, and other network configurations for the provisioned physical and virtual devices, and then deploy one or more services to be executed on the provisioned infrastructure. The prefab region may be brought to a state that is close to the final production state of the devices when they are installed at the destination facility.

Once the prefab region has been built, the physical resources may be configured for transmission/transportation to the destination facility. As used herein, the term "transmission" may be used synonymously with the term "transportation" within the context of moving the physical resources associated with the prefab region from the prefab factory to a destination site. Configuring the prefab region for transmission can include obtaining a "snapshot" of the current network configuration of the computing devices in the prefab region, storing the snapshot, providing a portion of the snapshot to each computing device that includes identifiers for each device and its neighboring devices within the network, encrypting data volumes of the computing devices, and configuring the devices to boot into a test state when powered on after transmission. In addition to network snapshots, the prefab services of the CSP 104 may also capture device snapshots which are disk images taken of fully configured individual switches, compute devices, and smart NICs in the various racks to be shipped to the destination site. The device snapshots can enable rapid replacement of any device in the racks that get shipped if that device is non-functional after arrival and has to be replaced. Transportation to a destination facility may be by one or more methods, including shipment by truck 112 or shipment by aircraft 114. For example, Prefab Region 106B may be configured to be delivered by truck 112 to data center 108, while Prefab Region 106C may be configured to be delivered by aircraft 114 to data center 110.

Once the computing devices of a prefab region arrive at the destination facility, they may be installed at the facility according to the configuration of the facility. The destination facilities can be data centers that have been built to host the prefab region devices, with networking, power, cooling, and other infrastructure provided according to the configuration of the prefab region. The data centers can have network connections to the CSP 104. Installation of the prefab region can include manual operations for connecting racks and their computing devices to the network infrastructure of the data centers and other related tasks. Once the physical connections have been made, the devices of the prefab region can be powered on, which can initiate one or more testing operations by the devices based on the configuration that was performed at the prefab factory 102 prior to transmission. The prefab regions can also connect to the CSP 104 via one or more network connections to the data center to communicate with prefab services. For example, Prefab Region 106B can connect to CSP 104 via connection 118, while Prefab Region 106C can connect to CSP 104 via connection 116. The prefab services can deploy final configurations for the installed devices, deploy updates to software resources on the installed devices, and perform additional testing and verification operations for the prefab region at the destination data center.

Figure 2:
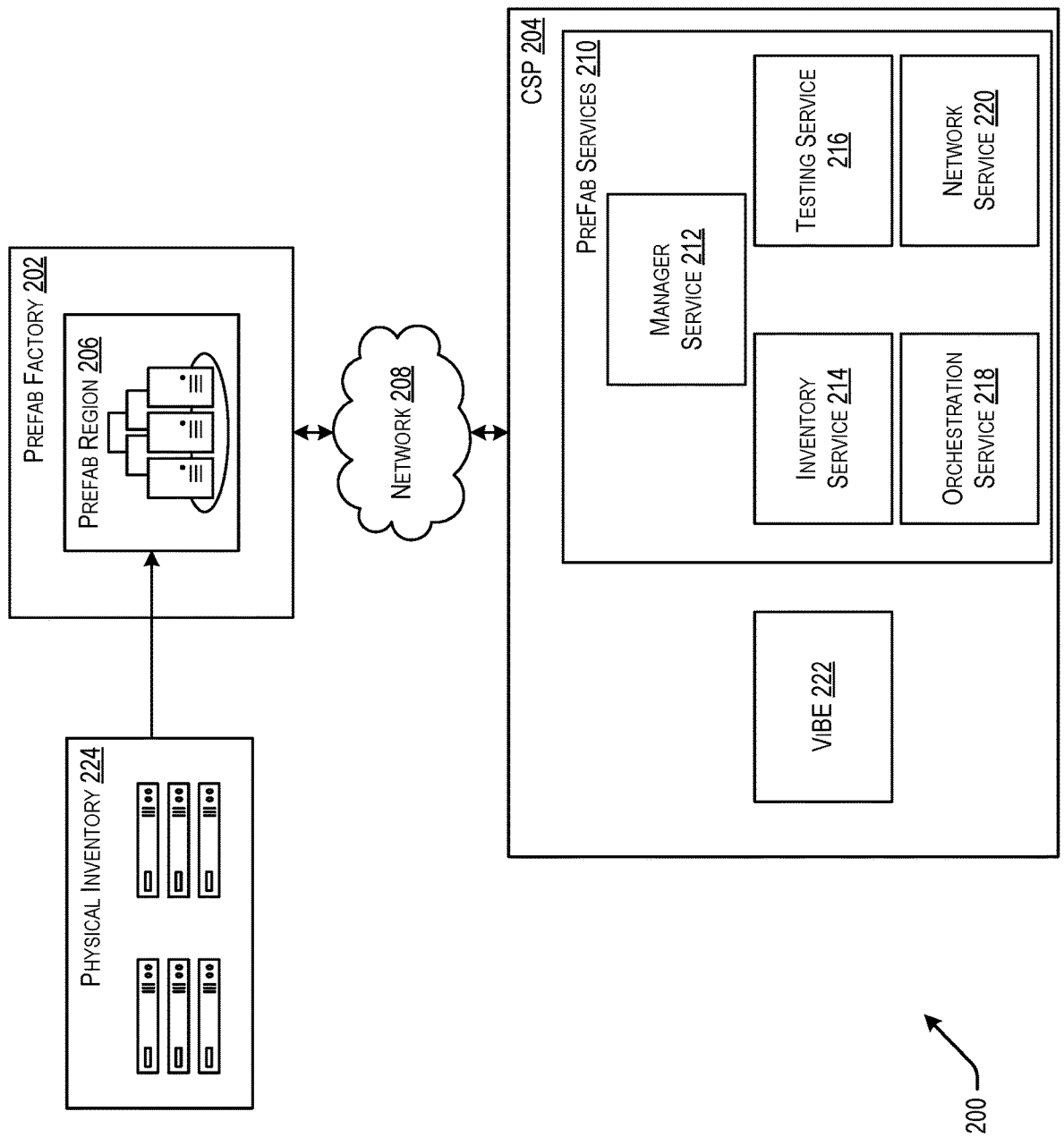
FIG. 2 is a block diagram illustrating a prefab factory connected to services provided by a CSP for building regions, according to at least one embodiment.

FIG. 2 is a block diagram illustrating a prefabrication system 200 including a prefab factory 202 connected to prefab services 210 provided by a CSP 204 for building regions, according to at least one embodiment. The prefab factory 202 may be an example of prefab factory 102 of FIG. 1, and CSP 204 may be an example of CSP 104 of FIG. 1. The prefab factory 202 may interface with the CSP 204 via network 208, which may be a public network like the Internet, a private network, or other network. The prefab services 210 can include manager service 212, inventory service 214, testing service 216, orchestration service 218, and network service 220. The prefab services 210 can perform operations corresponding to building the prefab region 206 in the prefab factory 202, including managing a bootstrapping environment (e.g., ViBE 222), provisioning infrastructure components in the Prefab Region 206, deploying software resources to the Prefab Region 206, configuring the network of the Prefab Region 206, testing the Prefab Region at various points during the build process, and managing the physical inventory (e.g., physical inventory 224) of computing devices used to build Prefab Region 206 and other prefab regions being built at prefab factory 202.

The manager service 212 can perform tasks to coordinate the operations of the prefab services 210, including scheduling prefab region build operations by other prefab services 210, generating physical build requests and corresponding instructions, initiating shipping of the prefab region 206 to a destination site, and managing the provisioning and deployment of resources in the prefab region 206 both in the prefab factory 202 and at the destination site. A physical build request can specify the number and type of physical resources to be used in Prefab Region 206. The physical build request can also include a set of instructions usable by personnel to install the corresponding physical resources in the prefab factory 202. For example, the manager service 212 may generate a physical build request that specifies the number of racks and server devices for Prefab Region 206, the number of networking devices usable to connect the server devices to form the network of Prefab Region 206, and the connection plan that determines the networking connections between the specified server devices, networking devices, and the existing networking infrastructure of the prefab factory 20. The physical build request can also include instructions for personnel to obtain physical devices from an associated location (e.g., physical inventory 224) and instructions to install the devices in the prefab factory 202 at specified locations. In some embodiments, operations of the physical build request may be performed by automated systems under the control of the manager service 212. For example, obtaining racks of server devices from physical inventory 224 and installing the racks at prefab factory 202 may be performed by a robotic system configured to move physical racks from site to site.

The inventory service 214 may be configured to track and monitor physical devices corresponding to one or more regions (e.g., one or more data centers of a region). The inventory service 214 can also track physical devices for one or more prefab regions (e.g., Prefab Region 206) in the prefab factory 202. Tracking and monitoring the physical devices can include maintaining an inventory of the devices according to an identifier of the device (e.g., serial number, device name, etc.) and the association of the devices with a data center. The inventory service 214 can provide inventory information to other prefab services 210, including manager service 212, for use in the prefab region build process. For example, inventory service 214 can determine if a physical device is located at prefab factory 202 or at a destination site. Inventory service 214 can query devices to determine their location and/or association with a region, prefab region, or data center via a network (e.g., network 208). Inventory service 214 can also maintain a physical inventory (e.g., physical inventory 224) of devices that are stored for use in prefab region build operations. For example, inventory service 214 can track physical devices as they are received at the physical inventory 224 and then retrieved from the physical inventory 224 to be used as part of a prefab region at prefab factory 202. In some examples, inventory service 214 can provide inventory information to manager service 212 that is usable to generate a physical build request for Prefab Region 206 that includes instructions to obtain physical resources from physical inventory 224 and install the physical resources at the prefab factory 202.

The physical inventory 224 may be a warehouse or storage facility for storing physical resources (e.g., computing devices) for use in prefab region build operations. The physical inventory 224 may be located near the prefab factory 202 to facilitate retrieval of physical resources according to a physical build request. For example, the physical inventory 224 may be a building adjacent to a building used for the prefab factory 202. In some examples, the physical inventory 224 may be located within the prefab factory 202. Physical resources may be placed into and retrieved from the physical inventory 224 by personnel associated with the CSP and the prefab factory 202. In some instances, during prefab region build operations, the retrieval and installation of physical resources from physical inventory 224 may be done by robots, automated guided vehicles, or other similar autonomous or semi-autonomous systems using instructions provided by the physical build request.

The orchestration service 218 may be configured to perform bootstrapping operations to provision infrastructure components in the Prefab Region 206 and to deploy software resources to the Prefab Region 206. The orchestration service 218 can also construct a bootstrapping environment (e.g., ViBE 222) for use when bootstrapping resources into the Prefab Region 206. The orchestration service 218 may be an example of a deployment orchestrator described above. In some examples, the orchestration service 218 may be configured to bootstrap (e.g., provision and deploy) services into a prefab region (e.g., Prefab Region 206) based on predefined configuration files that identify the resources (e.g., infrastructure components and software to be deployed) for implementing a given change to the prefab region. The orchestration service 218 can parse and analyze configuration files to identify dependencies between resources. The orchestration service 218 may generate specific data structures from the analysis and may use these data structures to drive operations and to manage an order by which services are bootstrapped to a region. The orchestration service 218 may utilize these data structures to identify when it can bootstrap a service, when bootstrapping is blocked, and/or when bootstrapping operations associated with a previously blocked service can resume.

In some embodiments, the orchestration service 218 may include components configured to execute bootstrapping tasks that are associated with a single service of a prefab region. The orchestration service 218 can maintain current state data indicating any suitable aspect of the current state of the resources associated with a service. In some embodiments, desired state data may include a configuration that declares (e.g., via declarative statements) a desired state of resources associated with a service. In some embodiments, orchestration service 218 can identify, through a comparison of the desired state data and the current state data, that changes are needed to one or more resources. For example, orchestration service 218 can determine that one or more infrastructure components need to be provisioned, one or more artifacts deployed, or any suitable change needed to the resources of the service to bring the state of those resources in line with the desired state. Specific details about a particular implementation of orchestration service 218 is provided in U.S. patent application Ser. No. 17/016,754, entitled "Techniques for Deploying Infrastructure Resources with a Declarative Provisioning Tool," the entire contents of which are incorporated in its entirety for all purposes.

The ViBE 222 may be an example of a bootstrapping environment that can be used to deploy resources to a prefab region in a prefab factory 202. A ViBE can include a virtual cloud network (e.g., a network of cloud resources) implemented within a suitable region of a CSP (e.g., CSP 204). The ViBE can have one or more nodes (e.g., compute nodes, storage nodes, load balancers, etc.) to support operations to host services deployed by orchestration service 218. The ViBE services can in turn be used to support deployment of services into the Prefab Region 206. For example, orchestration service 218 may deploy an instance of one or more constituent services of the orchestration service 218 into the bootstrapping environment (e.g., an instance of orchestration service 218), which in turn may be used to deploy resources from the VIBE 222 to the Prefab Region 206. Because a ViBE is implemented as a virtual cloud network in an existing region, any suitable amount of region infrastructure may be provisioned to support the deployed services within the ViBE (as compared to the fixed hardware resources of a seed server). The orchestration service 218 may be configured to provision infrastructure resources (e.g., virtual machines, compute instances, storage, etc.) for the VIBE 222 in addition to deploying software resources to the VIBE 222. The ViBE 222 can support bootstrapping operations for more than one prefab region in the prefab factory 202 at the same time.

When the Prefab Region 206 is available to support bootstrapping operations, the ViBE 222 can be connected to the Prefab Region 206 so that services in the VIBE 222 can interact with the services and/or infrastructure components of the Prefab Region 206. This can enable deployment of production level services, instead of self-contained seed services as in previous systems, and will require connectivity over the internet to the target region. Conventionally, a seed service was deployed as part of a container collection and used to bootstrap dependencies necessary to build out the region. Using infrastructure/tooling of an existing region, resources may be bootstrapped into the ViBE 222 and connected to the Prefab Region 206 in order to provision hardware and deploy services until the Prefab Region 206 reaches a self-sufficient state (e.g., self-sufficient with respect to services hosted within the Prefab Region 206). Utilizing the ViBE 222 allows for standing up the dependencies and services needed to be able to provision/prepare infrastructure and deploy software while making use of the host region's resources in order to break circular dependencies of core services.

The testing service 216 may be configured to perform one or more test operations or validation operations on the Prefab Region 206 following the provisioning and/or deployment of resources. The test operations may be part of a user-acceptance test usable to determine if the behavior of the built region conforms to a build specification. For example, testing service 216 may perform a test that interacts with an instance of a service deployed to the Prefab Region 206 to verify an expected operation of the queried service. As another example, testing service 216 may perform a networking test to obtain hostnames, networking addresses, and/or other identifiers of the components of the Prefab Region 206 to compare to the expected identifiers of the components as specified in a build request or other specification for the Prefab Region 206. Testing service 216 may perform test operations both during the prefab region build process at prefab factory 202 and after delivery of the Prefab Region 206 to a destination site. The testing operations performed at the prefab factory 202 may be the same or different from testing operations performed after the Prefab Region 206 is delivered to the destination site.

The network service 220 may be configured to determine the network configuration of the devices in the Prefab Region 206. The network service 220 can use configuration information from a build request to determine a network topology of the devices (e.g., servers, networking devices, racks of servers and networking devices, etc.). As used herein, a network topology may refer to a graph representation of all the networking connections between each computing device in a prefab region. The network service 220 can use the configuration information to determine physical networking connections (e.g., network cabling connections) to be made between the device in the prefab region. The network service 220 may provide the networking connection information to the manager service 212 to be used to generate instructions for physically installing the devices for the prefab region in the prefab factory 202. The network service 220 may also obtain device information from inventory service 214 as part of determining the network topology for the devices in a prefab region. Additional details about the network service 220 are provided below with respect to FIGS. 5 and 6.

Figure 3:
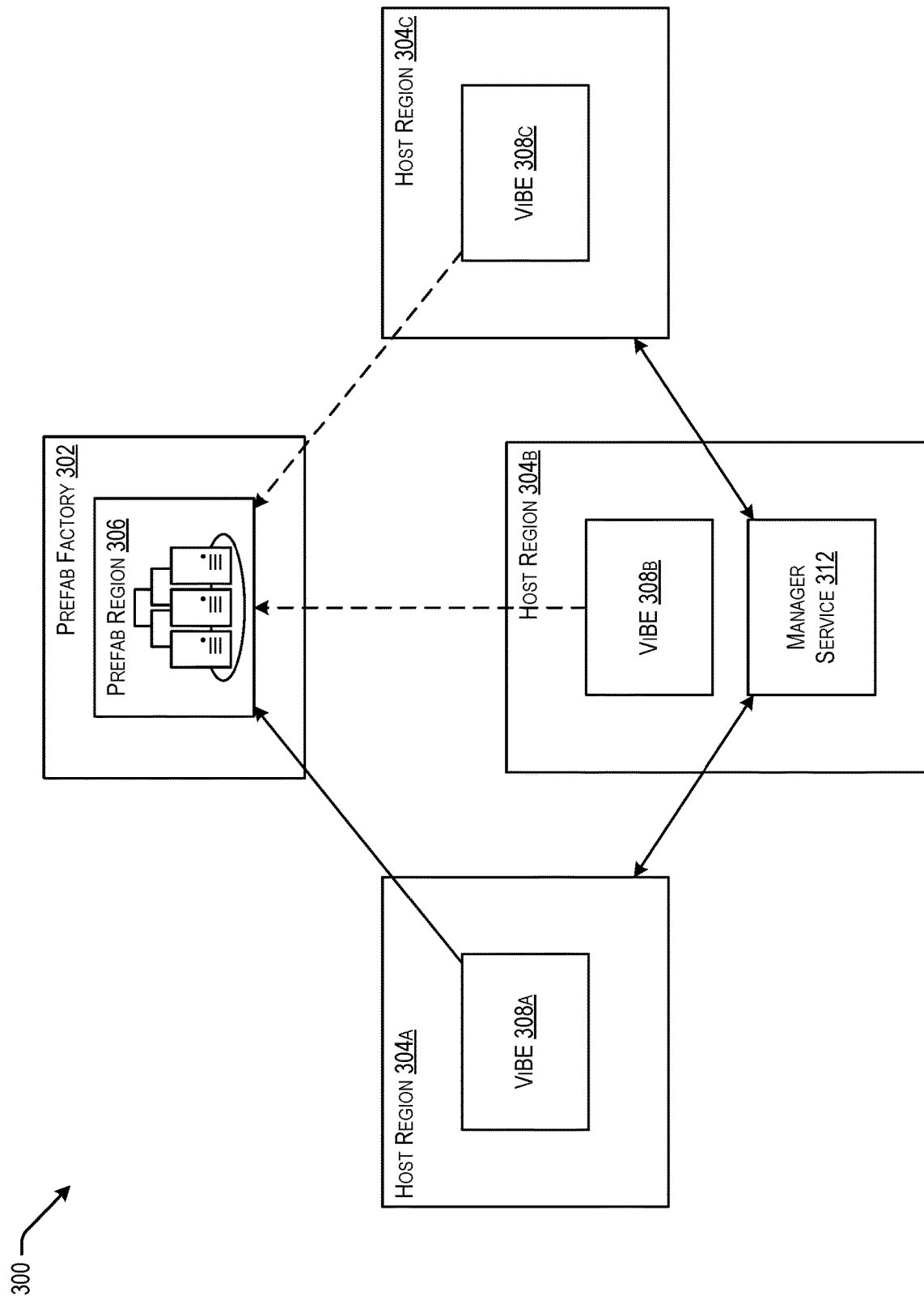
FIG. 3 is a block diagram illustrating a CSP system that includes multiple host regions that can support a ViBE for deploying software resources to a prefab region being built at a prefab factory, according to at least one embodiment.

FIG. 3 is a block diagram illustrating a CSP system 300 that includes multiple host regions (e.g., host regions 304A-304C) that can support a ViBE (e.g., ViBEs 308A-308C) for deploying software resources to a Prefab Region 306 being built at a prefab factory 302, according to at least one embodiment. Prefab factory 302 may be an example of prefab factory 202 described above with respect to FIG. 2. Similarly, ViBEs 308A-308C may each be examples of ViBE 222 of FIG. 2, while manager service 312 may be an example of manager service 212 of FIG. 2. Host regions 304A-304C may correspond to regions of the CSP and can be associated with one or more data centers having computing resources for hosting a ViBE. The host regions 304A-304C may correspond to different geographical locations.

As depicted in FIG. 3, the manager service 312 may be an instance within one host region (e.g., host region 304B). In some embodiments, the manager service 312 may correspond to a tenancy of the CSP and may therefore have an instance in multiple regions (e.g., host regions 304A, 304C) from which prefab services can be provided. Similarly, other prefab services (e.g., prefab services 210) may also be instances of services within a host region.

A ViBE may be hosted within a host region to support prefab region build operations at prefab factory 302. Because a ViBE may be constructed by an orchestration service (e.g., orchestration service 218) as needed for bootstrapping a prefab region, the ViBE can be built in any suitable host region. Suitability as a host region can be based on network connectivity to the prefab factory 302 (e.g., high-bandwidth, high data rate, low latency network connection between the data center(s) of the host region to the prefab factory 302), sufficient infrastructure resources to support the ViBE for one or more prefab region build operations (e.g., availability of computing resources in the host region for the length of time to provision and deploy the prefab region(s), and/or jurisdictional considerations (e.g., a host region in the same country as the prefab factory to comply with regulations regarding data security). For example, host region 304A may include a data center in close proximity to prefab factory 302, resulting in a low latency network connection between ViBE 308A and Prefab Region 306. During successive prefab region build operations, a ViBE used to support the prefab region build may be constructed in a different host region. For example, ViBE 308A may be used as part of a prefab region build at prefab factory 302 for one prefab region, but then ViBE 308B in host region 304B or ViBE 308C in host region 304C may be constructed and used for a subsequent region build operation.

In addition, the prefab factory 302 may be built in a location to provide suitable connectivity to one or more host regions. For example, prefab factory 302 may be constructed at a site adjacent to a data center of host region 304A, to provide suitable network connectivity between host region 304A and prefab factory 302.

Figure 4:
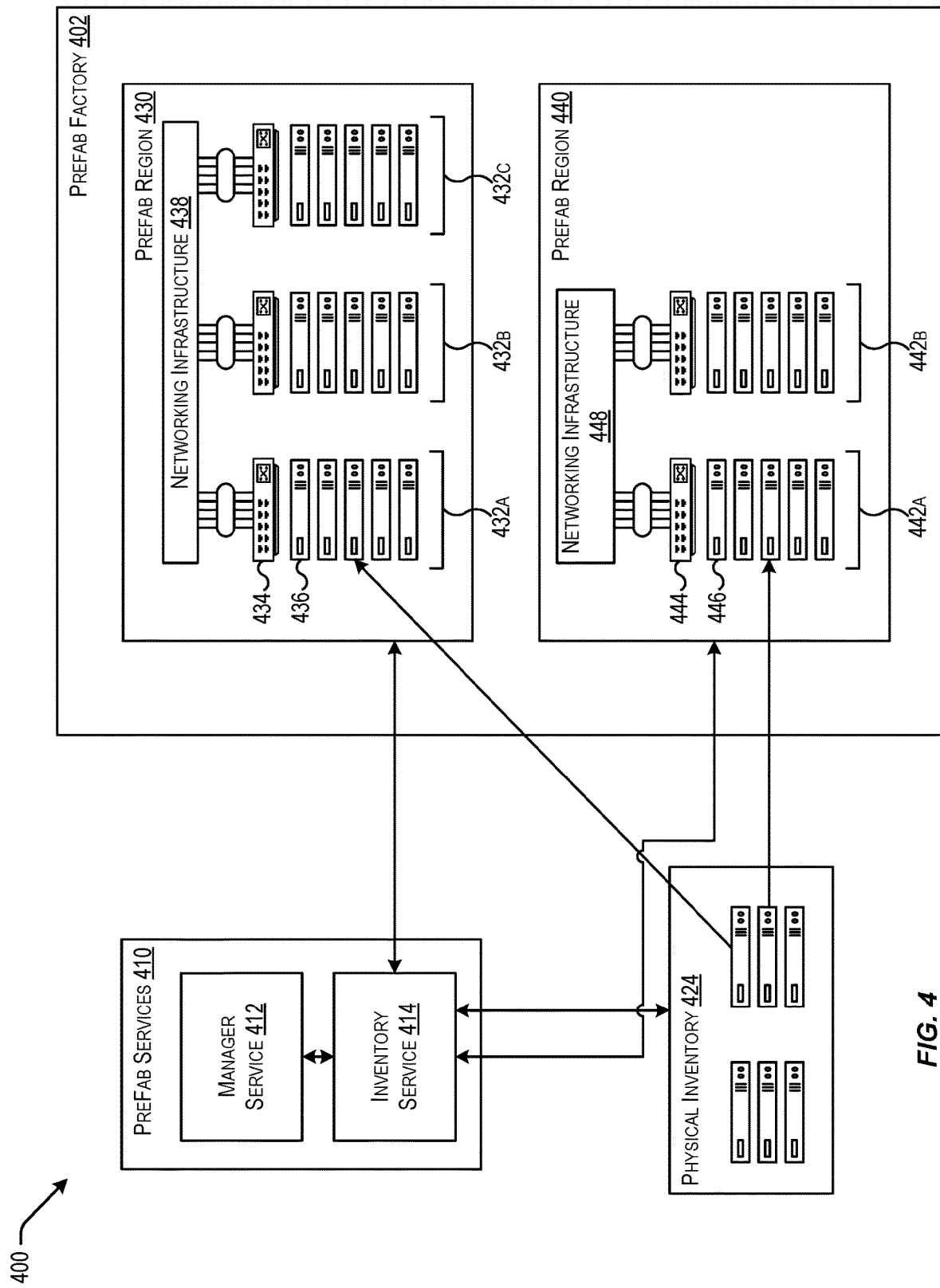
FIG. 4 is a block diagram illustrating an arrangement of physical computing resources in a prefab factory managed with a manager service and inventory service, according to at least one embodiment.

FIG. 4 is a block diagram illustrating a CSP system 400 having an arrangement of physical computing resources in a prefab factory 402 for different Prefab Regions 430, 440 according to at least one embodiment. Prefab factory 402 may be an example of prefab factory 202 of FIG. 2. Prefab services 410 may be provided by the CSP and may be examples of prefab services 210 described above with respect to FIG. 2, including manager service 412 as an example of manager service 212 of FIG. 2 and inventory service 414 as an example of inventory service 214 of FIG. 2. Similarly, Prefab Region 430 and Prefab Region 440 may be examples of other prefab regions described herein, including Prefab Region 206 of FIG. 2.

As described above, prefab factory 402 may support multiple prefab region build operations at the same time. As depicted in FIG. 4, prefab factory 402 includes Prefab Region 430 and Prefab Region 440. Prefab Region 430 can include one or more server racks 432A-432C. Each server rack can include one or more devices, including server devices and networking devices. For example, server rack 432A can include switch 434 and server device 436. Switch 434 may be a top-of-rack switch that provides networking connections to other server racks (e.g., via top-of-rack switches at the other server racks) or other physical resources of the Prefab Region 430. Networking connections between physical resources in Prefab Region 430 may include parts of networking infrastructure 438. Networking infrastructure 438 may include a portion of the networking infrastructure of prefab factory 402, including network cabling, network switches, routers, and the like that form the network fabric of the prefab factory 402. Similarly, Prefab Region 440 can include one or more server racks 442A-442B, which can include more or fewer computing devices than server racks 432A-432C of Prefab Region 430. For example, server rack 442A can include switch 444 and server device 446.

Each prefab region may be at a different point of the prefab region build process at any given time. For example, Prefab Region 430 may be undergoing infrastructure provisioning and resource deployment while Prefab Region 440 may be undergoing installation of physical resources. In addition, each prefab region at the prefab factory 402 may include a different arrangement of physical resources. For example, Prefab Region 430 can include a greater number of server racks (e.g., racks 432A-432C) than Prefab Region 440, with each server rack supporting a greater number of computing devices than the server racks of Prefab Region 440 (e.g., server racks 442A, 442B). Because the number and arrangement of physical resources in each prefab region can be different, the network topology corresponding to the connections between the physical resources can be different for each prefab region.

Inventory service 414 can track physical resources used to form the prefab regions in the prefab factory 402. The physical resources tracked by inventory service 414 can included server devices and networking devices as well as racks of server devices and networking devices. Inventory service 414 can also track physical resources at data centers for deployed regions, including prefab region devices after delivery to and installation at a destination site. In some embodiments, inventory service 414 can connect to the prefab regions (e.g., via a network) and query device identifiers for devices in the prefab regions. Inventory service 414 may provide information corresponding to the physical resources in a prefab region to manager service 412 as part of prefab region build operations. For example, manager service 412 may use inventory information from inventory service 414 to determine if physical resources for a prefab region were installed according to a physical build request. In some embodiments, inventory service 414 can also maintain information corresponding to physical inventory 424 (e.g., a repository, warehouse, or other storage for computing devices and other physical resources used to construct a prefab region). Maintaining the physical inventory 424 can include tracking the number and type of physical resources available for use in a prefab region, maintaining a database or other datastore of inventory information, updating the inventory information as new physical resources are added to physical inventory 424 (e.g., delivery of new devices, construction of a server rack, etc.), and updating the inventory information as devices leave the physical inventory for use in the prefab factory 402 (as depicted by the arrows in FIG. 4). In some examples, CSP personnel may interact with inventory service 414 to provide manual updates to inventory information.

The manager service 412 can obtain inventory information from inventory service 414 for use when generating a physical build request. For example, the inventory information may be used by manager service 412 to determine which physical resources to install in the prefab factory 402 for a prefab region corresponding to the physical build request.

Figure 5:
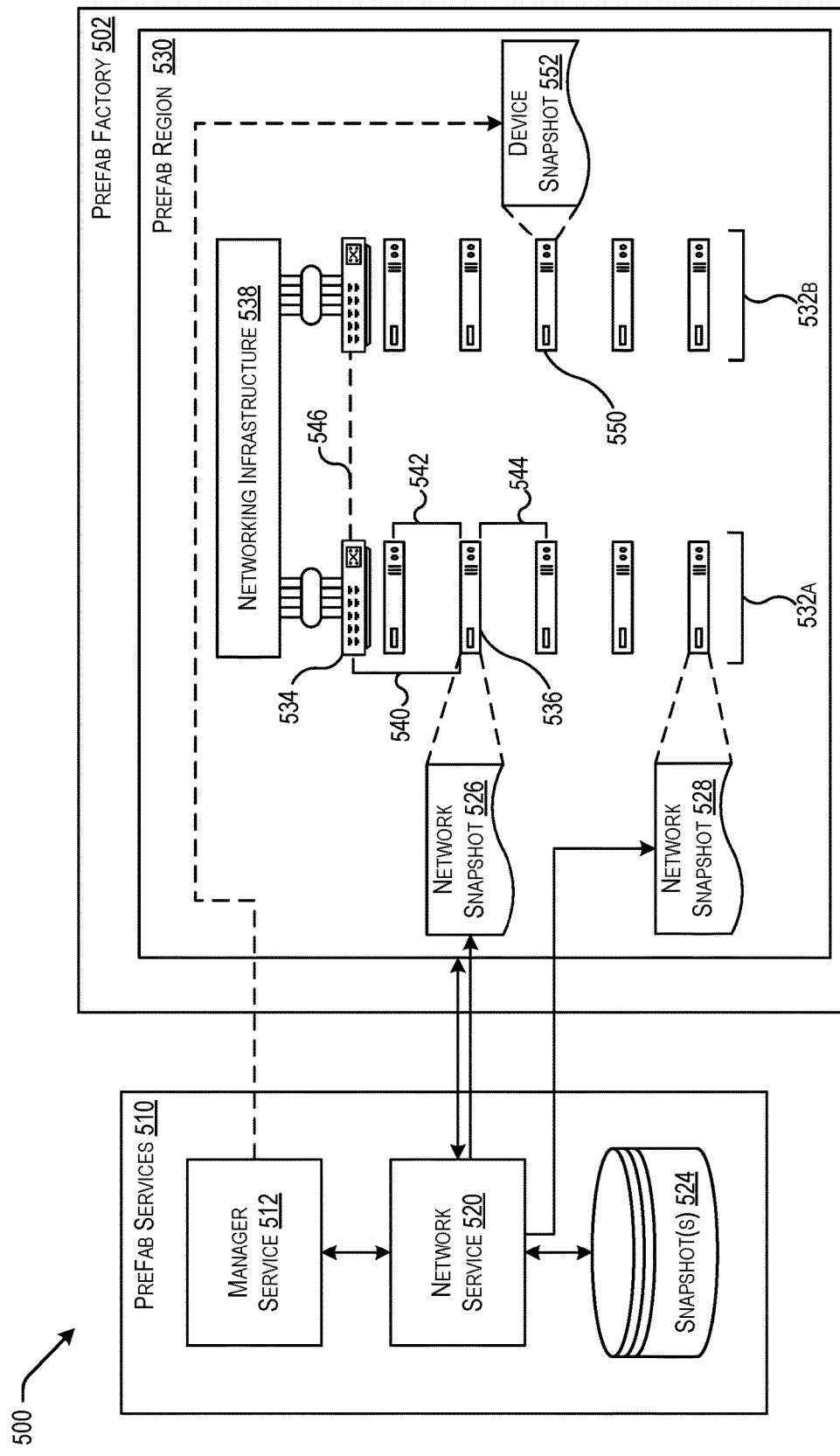
FIG. 5 is a diagram illustrating managing a network configuration of computing resources of a region being built in a prefab factory using a manager service and a network service, according to at least one embodiment.

FIG. 5 is a diagram illustrating a CSP system 500 for managing a network configuration of computing resources of a Prefab Region 530 being built in a prefab factory 502 using a manager service 512 and a network service 520, according to at least one embodiment. The prefab factory 502 and Prefab Region 530 may be examples of other prefab factories and prefab regions described herein, including prefab factory 202 and Prefab Region 206 of FIG. 2. Prefab services 510 may be provided by the CSP and may be examples of prefab services 210 described above with respect to FIG. 2, including manager service 512 as an example of manager service 212 of FIG. 2 and network service 520 as an example of network service 220 of FIG. 2.

As described above with respect to FIG. 2, the manager service 512 can perform tasks to coordinate the operations of the prefab services 510, including scheduling prefab region build operations by other prefab services 510, generating physical build requests and corresponding instructions, and configuring Prefab Region 206 for shipping to a destination site. A physical build request can specify the number and type of physical resources to be used in Prefab Region 206. The network service 520 can use configuration information from a build request to determine a network topology of the devices (e.g., servers, networking devices, racks of servers and networking devices, etc.). The network service 520 can also determine the network configuration of devices of the Prefab Region 530 after the provisioning of infrastructure components in the Prefab Region 530.

In some examples, the network service 520 can store a snapshot of the network configuration of a prefab region (e.g., Prefab Region 530). A snapshot can include information about the network topology of the prefab region at a specific point in time, including network identifiers (e.g., network addresses, hostnames, etc.) for the devices in the prefab region, the current network connections between the devices, the physical networking interfaces between the devices and the networking infrastructure 538 of the prefab factory 502, and network settings for the devices (e.g., port configurations, gateway configurations, etc.). As an example, server device 536 may be a computing device in server rack 532A of Prefab Region 530. Server device 536 may have a networking connection 540 to switch 534 of server rack 532. The network configuration of Prefab Region 530 can then include information associating server device 536 to switch 534, including information specifying the type of network connection 540, the port of switch 534 to which server device 536 is connected, and the settings of both server device 536 and switch 534 that correspond to the networking connection 540 between them. In addition, the network configuration can include information that associates server device 536 with "neighboring" devices in Prefab Region 530 that have networking connections 542, 544 between them. The networking connections 542 and 544 may be via switch 534, so that server device 536 may be communicatively connected to other devices in server rack 532A via network connections 542, 544. In some examples, "neighboring" devices of a given device in Prefab Region 530 can include each computing device on the same server rack. In addition, switch 534 may have a network connections to one or more other switches within Prefab Region 530 (e.g., network connection 546 to a switch of server rack 532B).

The network snapshot may be used to validate the physical installation (e.g., physical networking connections) of Prefab Region 530 after the devices are installed at the destination site. For example, network service 520 can provide the network snapshot (or a portion of the snapshot) to each device in the Prefab Region 530 as part of configuring the Prefab Region 530 for transportation to a destination site. For example, network service 520 may provide network snapshot 526 to server device 536 for storage at server device 536. Network snapshot 526 may be a portion of the network snapshot corresponding to the network configuration of the entire Prefab Region 530. Network snapshot 526 can include an identifier (e.g., network address, hostname, etc.) for server device 536 and information associating server device 536 with one or more other devices in Prefab Region 530. The information associating server device 536 with a neighboring device can include an identifier for the neighboring device and information about the network connection between them. For example, server device 536 can use network snapshot 526 to identify neighboring devices and communicate with the neighboring devices over the network connection.

The network service 520 may also maintain a network configuration for the network fabric of the prefab factory 502. For example, the prefab factory 502 can have networking infrastructure to support multiple, separate prefab regions being built at the same time. The prefab factory 502 can have multiple dedicated locations for placing server racks for the prefab regions being built. Each location may have a set of networking cables of the networking infrastructure that terminate at the location that can be connected to the server racks. Based on the devices placed at the location, specific cables from the set of networking cables can be connected to the devices (e.g., to a top-of-rack switch) to connect the devices to other devices in the prefab region using a portion of the network fabric of the prefab factory 502. For example, server rack 532A may be placed at a location within the prefab factory 502 and connected to networking infrastructure 538 using switch 534, while server rack 532B may be placed at a second location and connected to networking infrastructure 538.

In addition to operations for preserving the network configuration of the Prefab Region 530, configuring Prefab Region 530 for transportation to a destination site can also include the manager service 512 configuring each device to enter a testing state during a subsequent power-on of the device, encrypting data volumes of the devices with encryption keys, storing the encryption keys at a device that can act as a key server for the Prefab Region 530 during initialization at the destination site, and configuring one of the devices to act as dynamic host configuration protocol (DHCP) server during initialization of the Prefab Region 530 at the destination site. Manager service 512 may also generate instructions usable by personnel or robotic systems associated with the prefab factory 502 for packing the devices for transmission. Manager service 512 may also generate instructions usable by personnel associated with the destination facility for installing and connecting the devices at the destination facility.

In some embodiments, configuring the devices of Prefab Region 530 can also include operations to capture device snapshots of each device. A device snapshot can include a software image of one or more disk drives or other memory of a computing device, which can be used to duplicate the software configuration of the device onto a replacement device. The manager service 512 can generate the device snapshots in conjunction with one or more of the prefab service 510. The device snapshots may be stored along with the network snapshot(s) in a database or datastore (e.g., snapshot(s) 524). As a particular example, manager service 512 can generate device snapshot 552 of server device 550 of Prefab Region 530 at the prefab factory 502. The device snapshot 552 may be used to image another physical device that has the same or similar physical configuration as server device 550 in order to create a duplicate server device in the event that server device 550 fails (e.g., damaged or lost during transit to the destination site).

Figure 6:
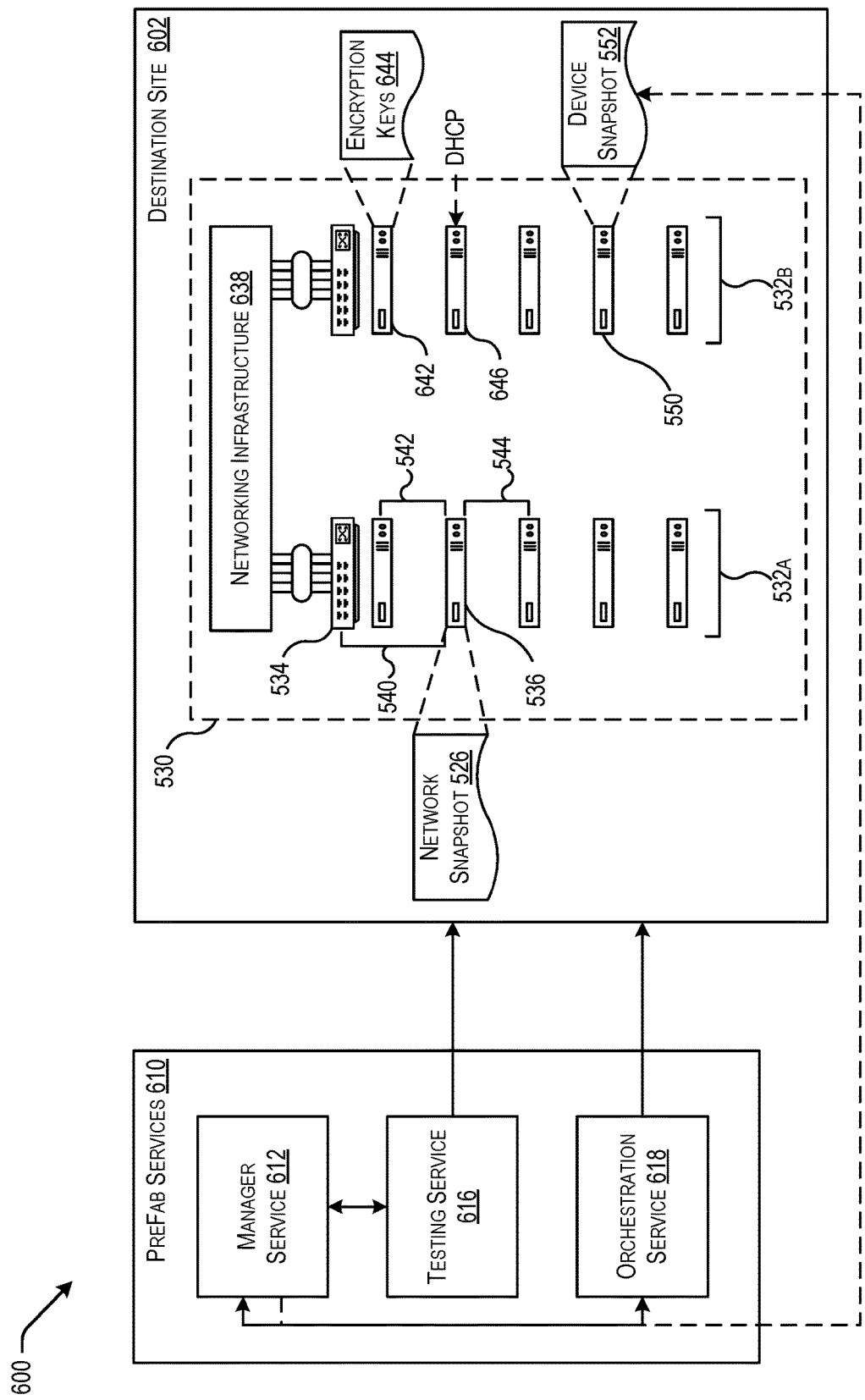
FIG. 6 is a diagram illustrating a testing and evaluation of a region after delivery to a destination site using a manager service and a testing service, according to at least one embodiment.

FIG. 6 is a diagram illustrating a CSP system 600 for testing and evaluation of a Prefab Region 530 after delivery to a destination site 602 using a manager service 612 and a testing service 616, according to at least one embodiment. The destination site 602 may be a data center facility at a location corresponding to new region to be deployed for the CSP using the computing resources of Prefab Region 630. Prefab services 610 may be provided by the CSP and may be similar to prefab services 210 of FIG. 2, including manager service 612 as an example of manager service 212, testing service 616 as an example of testing service 216, and orchestration service 618 as an example of orchestration service 218 of FIG. 2.

Shipping Prefab Region 530 to the destination site 602 can include powering down each device, disconnecting the devices from the networking infrastructure of the prefab factory, and packing the devices as appropriate for transit. Server racks (e.g., server racks 532A, 532B may be shipped intact, without disconnecting individual devices of the server rack. Once delivered to the destination site 602, the server racks may be positioned in the destination site 602 per the physical layout of the resulting data center and connected to the networking infrastructure 638 of the destination site. For example, networking connections may be made between the networking infrastructure 638 and the switches of the server racks 532A, 532B by connecting one or more networking cables to the switches (e.g., switch 534).

As described above, the devices in Prefab Region 530 may have been configured to boot into a test mode when first powered on at the destination site 602. In some embodiments, the devices may have a dedicated boot volume to support the test mode during initialization at the destination site 602. In other embodiments, the boot volume may be configured on an external device connected to each device in the Prefab Region 530. For example, each server device (e.g., server device 536) may be connected to a smart network interface card (SmartNIC) that provides a low-overhead boot volume that can be used to boot the server device into a test mode. Because the boot volume may only be used to support the test mode, the data on the boot volume may not need to be encrypted as with data volumes on the server devices.

The test mode may be configured to cause each computing device to validate its connection to other devices in the Prefab Region 530. The validation can determine if the physical network connections of the devices to the networking infrastructure 638 at the destination site 602 were made correctly. To validate a connection, a device in the test mode may use a stored network configuration or portion of the network configuration that was determined by a network service (e.g., network service 520 of FIG. 5) and stored at each device. For example, server device 536 can use network snapshot 526 to determine a neighboring computing device that is communicatively connected to server device 536 by network connection 542. To validate the network connection 542, server device 536 may send a validation request to the neighboring computing device. If the network connection 542 is intact, then server device may receive a validation indication from the neighboring computing device that indicates that the validation request was successfully received at the neighboring computing device. The server device 536 may validate all of the connections specified in network snapshot 526. Similarly, devices on one server rack (e.g., server rack 532A) may validate a connection to each other server rack (e.g., server rack 532B) in the Prefab Region 530.

In some embodiment, one device of Prefab Region 530 may be configured to act as a DHCP server (e.g., DHCP server 646). The DHCP server 646 may provide network addresses or other identifiers to the devices in Prefab Region 530 during initialization. For example, during test mode, each device may validate a connection to the DHCP server 646 and then receive an address, identifier, or other network configuration information from the DHCP server 646. The device may compare the received identifier to an identifier included in the network configuration that was generated by the network service during prefab region build operations at the prefab factory. For example, server device 536 can receive an identifier from DHCP server 646 and then compare the received identifier to an identifier in network snapshot 526. Because the Prefab Region 530 should not have undergone any component changes during transit, the network configuration of the Prefab Region 530 at the destination site 602 should be unchanged, including configuration information from DHCP server 646. That is to say, server devices in the Prefab Region should receive the same network addresses from DHCP server 646 after installation of the devices at the destination site 602. If the network configuration changes, then the server devices can indicate that the network configuration of Prefab Region 530 may be incorrect.

In some embodiments, if any device was damaged in transit and no longer works, operators at the destination site may replace the broken device with a new replacement device and configure the new device with the device snapshot taken prior to shipping thus allowing the on-site post-install validation to complete successfully even if there was hardware failure in transit. For example, server device 550 may be damaged during transportation to the destination site 602. Discovery of the non-functional state of server device 550 may occur during testing operations to validate the network configuration of the Prefab Region 530. To recover, the manager service 612 can generate instructions to replace server device 550 with an identical physical device at the same location on server rack 532B. Once the replacement device is installed, the manager service 612 can deploy the device snapshot 552 that was generated during prefab region build operations in the prefab factory 502. Deploying the device snapshot 552 can include imaging one or more disk drives or other memories of the replacement server device to bring the replacement server device to the same software configuration as server device 550 in the Prefab Region 530 prior to transportation to the destination site 602. Other devices, including networking devices like switch 534, may be similarly replaced and restored using the captured device snapshots.

The DHCP server 646 can perform test mode validation operations similar to other devices within Prefab Region 530. If DHCP server 646 can successfully validate the network connections between neighboring devices and itself, DHCP server 646 can exit test mode and begin operating as a DHCP server to other devices in the Prefab Region 530. In some embodiments, DHCP server 646 may complete its test mode validation operations prior to other devices in Prefab Region 530 completing their test mode validation operations. For example, server device 536 may boot into test mode and attempt to validate a network connection to DHCP server 646 before validating network connection 542 or network connection 544 between itself and neighboring computing devices. DHCP server 646 may not send a validation indication to server device 536 until DHCP server 646 has completed its own test mode validation operations. Server device 536 can then wait a predetermined amount of time and retry the validation request to DHCP server 646. Similarly, other computing devices performing test mode validation operations may wait and retry validation requests until DHCP server 646 is operational.

As described above, data volumes of the devices in Prefab Region 530 may be encrypted prior to transportation to the destination site 602. The encryption keys used to encrypt the data volumes of each device may be associated with that specific device. The encryption keys 644 may be stored at one of the computing devices in Prefab Region 530 configured to act as a key server for the Prefab Region 530 during initialization(e.g., stored at key server 642). The encryption keys 644 may themselves be encrypted by a master key. In some embodiments, encryption keys 644 may be secured by a hardware security module (e.g., a trusted platform module (TPM)). The hardware security module may be part of key server 642 or may be part of another device connected to key server 642 (e.g., a SmartNIC, an external security device, etc.). In some embodiments, the master key or external security device may be delivered to the destination site 602 separately from the Prefab Region 530 (e.g., by operations personnel) and provided to or installed at the key server 642 as part of the installation operations for Prefab Region 530. Key server 642 may perform test mode validation operations similar to other computing devices in Prefab Region 530. If test mode validation operations complete successfully, key server 642 may begin providing encryption keys 644 to other computing devices in the Prefab Region to decrypt the data volumes. For example, key server 642 may receive a key request from server device 536. In response, key server 642 can decrypt the data volume storing encryption keys 644 (e.g., via a master key, via a hardware security module), retrieve an encryption key corresponding to server device 536, and send the encryption key to server device 536.

Once the Prefab Region 530 has been installed and initialized at destination site 602 (e.g., devices boot into a normal operating mode, data volumes decrypted, services deployed during prefab region build operations at the prefab factory are executing), testing service 616 can perform one or more acceptance tests. An acceptance test can include verifying that all services are functioning as expected. For example, testing service 616 can interact with a service executing at Prefab Region 530 to verify that the service is operating according to the requirements that define the acceptance test. Testing service 616 can provide results of an acceptance test to manager service 612 indicating that Prefab Region build is complete.

During transportation of Prefab Region 530 to destination site 602, updates or other changes may be specified for one or more infrastructure components and/or software resources that had been provisioned at and/or deployed to Prefab Region 530 at the prefab factory. For example, a service may have been updated to a newer version during the transit time. Before the prefab region build operation is complete, orchestration service 618 can deploy updated software resources to Prefab Region 530 at destination site 602. Deploying an updated software resource may occur similar to deployment of software resources to the Prefab Region 530 at the prefab factory.

Figure 7:
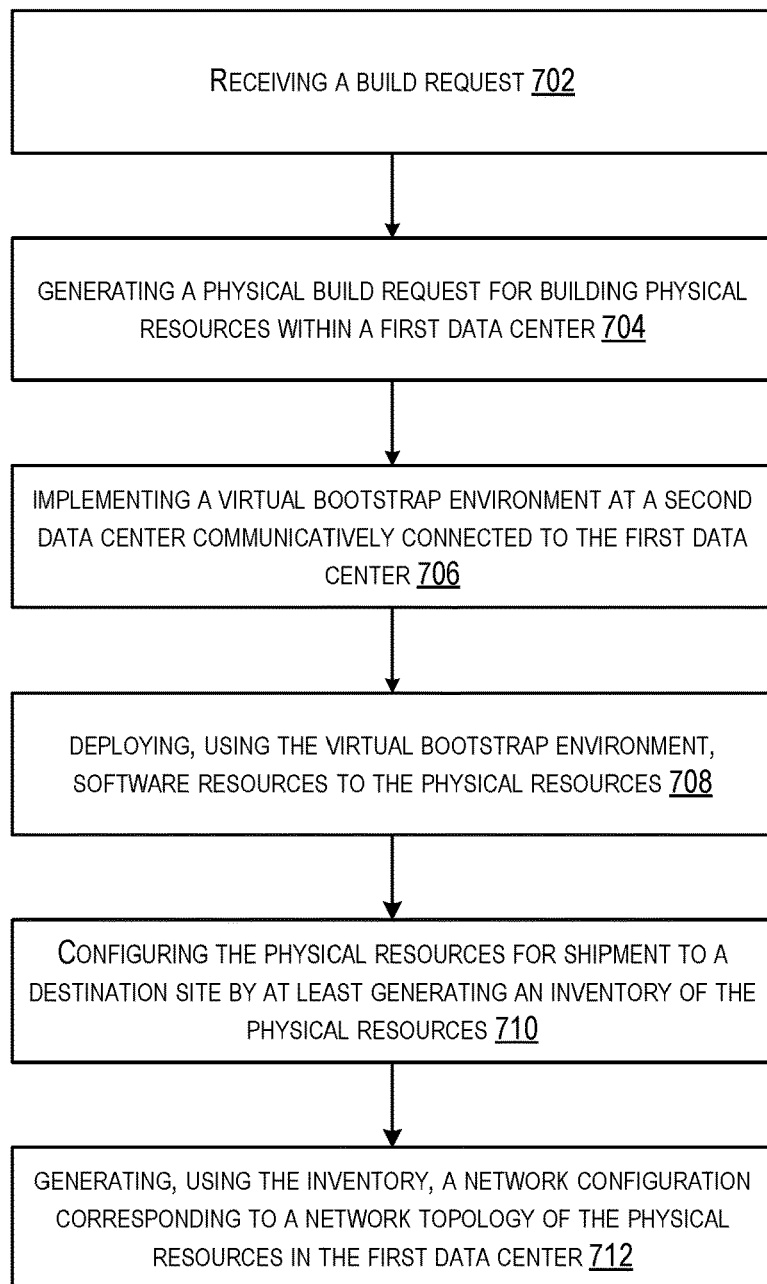
FIG. 7 is an example method for deploying software resources to physical resources of a region being built in a prefab factory and preparing the physical resources for transportation to a destination data center, according to at least one embodiment.

FIG. 7 is an example method for deploying software resources to physical resources of a region being built in a prefab factory and preparing the physical resources for transmission to a destination data center, according to at least one embodiment. The method 700 may be performed by one or more components of a computer system, including one or more components of a computer system of a CSP (e.g., CSP 204 of FIG. 2) that execute a manager service (e.g., manager service 212 of FIG. 2). The operations of method 700 may be performed in any suitable order, and method 700 may include more or fewer operations than those depicted in FIG. 7.

Some or all of the method 700 (or any other processes and/or methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The method 700 may begin at block 702 with a manager service receiving a build request. The manager service may be an example of any manager services described herein, including manager service 212 of FIG. 2. The manager service may execute on one or more computing devices of a CSP computer system. The manager service may be one of a plurality of services of the CSP that are configured to perform operations to build a prefab region (e.g., Prefab Region 206 of FIG. 2) in a prefab factory (e.g., prefab factory 202 of FIG. 2). The build request may be a specification or configuration containing information characterizing a prefab region. For example, the build request can include information that defines the size of the prefab region (e.g., the number of computing devices, server racks, etc.), the number and type of services, applications, and other software that will be executed on the computing devices in the prefab region, requirements for computing capabilities (e.g., the number of processors in each computing device, the computing speed of the processors, etc.) in the prefab region, requirements for the types of storage provided in the prefab region, and other similar definitions. In some embodiments, the build request may be provided by operations personnel or system architects that design the prefab regions.

At block 704, the manager service may generate a physical build request for building physical resources within a first data center. The first data center may be a prefab factory (e.g., prefab factory 202 of FIG. 2). The manager service can use information in the build request to generate the physical build request. The physical resources can include server devices, networking devices, and other computing devices that may be used to build a prefab region in the first data center. The physical build request can include information identifying specific physical resources to be built in the first data center. For example, the manager service can interact with an inventory service (e.g., inventory service 214 of FIG. 2) to obtain an inventory of available server devices and server racks in a physical inventory of such devices (e.g., physical inventory 224 of FIG. 2). The manager service can then determine the specific server racks to be used to build the prefab region corresponding to the build request and include that information in the physical build request. The physical build request can also include instructions usable by, for example, operations personnel to retrieve, move, and install the physical resources into the first data center. For example, the instructions can identify specific locations within the first data center to place server racks and instructions for completing specific network connections to the server rack to form the network of the prefab region.

At block 706, the manager service can implement a ViBE (e.g., ViBE 222 of FIG. 2) at a second data center. The second data center can be communicatively connected to the first data center. For example, the manager service may implement the ViBE in a host region of a CSP that is connected to a prefab factory via a network (e.g., network 208 of FIG. 2). The manager service can implement the ViBE in conjunction with an orchestration service (e.g., orchestration service 218 of FIG. 2). For example, the manager service may provide an indication to the orchestration service to build the ViBE, specifying the second data center in which the ViBE is to be constructed. The manager service may implement the ViBE in response to an indication that the physical resources corresponding to the physical build request have been built (e.g., installed, powered on, and functioning normally in the first data center). The indication may be provided by operations personnel after installing the physical resources. In some embodiments, the indication may be provided by the one or more of the physical resources after completing a self-check or other validation of the installation.

At block 708, the manager service can use the ViBE to deploy software resources to the physical resources. The software resources may be associated with cloud services executed on the physical resources. For example, the software resources may be components of a production service (e.g., a database service) that will execute in a prefab region after the prefab region is delivered to a destination site. The manager service can deploy software resources in conjunction with the orchestration service.

At block 710, the manager service can generate an inventory of the physical resources. The manager service may operate in conjunction with the inventory service to generate the inventory. At block 712, the manager service can use the inventory to generate a network configuration corresponding to a network topology of the physical resources in the first data center. The manager service may operate in conjunction with a network service (e.g., network service 220 of FIG. 2) to generate the network configuration. The network configuration may be a network snapshot of the prefab region. The network configuration can include an identifier for a physical resource in the inventory (e.g., a network address for a server device) and information associating the physical resource with neighboring physical resources according to the network topology. For example, the network configuration may identify each computing device and the network connections between the computing device and one or more neighboring computing devices. The operations of block 710 and block 712 may be operations for configuring the physical resources for transmission to a destination site. The destination site may be a third data center. In some embodiments, the manager service may send a portion of the network configuration to the physical resource. The portion of the network configuration can include the identifier corresponding to the physical resource and the information associating the physical resource with the neighboring physical resources in the network topology. In some embodiments, configuring the physical resources for transmission to a destination site can include encrypting, using an encryption key associated with each physical resource, at least a portion of the software resources deployed to each physical resource and storing each encryption key at one of the physical resources (e.g., key server 642 of FIG. 6) designated to host a key service at the second data center.

In some embodiments, the manager service can receive an indication that the physical resources have been delivered to and built (e.g., installed) at the destination site. In response to the indication, the manager service can validate the topology of the physical resources at the destination site. For example, the manager service, in conjunction with the network service, may obtain a network configuration of the physical resources at the destination site and compare the network configuration to information included in a stored network snapshot that was obtained before the physical resources were shipped to the destination site. If the network topology of the physical resources at the destination site is validated, the manager service may deploy one or more updated software resources to the physical resources. For example, the manager service may operate with the orchestration service to deploy updated software components for a service that was deployed in the prefab region at the prefab factory, but which were moved to a newer version during transit of the physical resources to the destination site.

In some embodiments, the manager service can perform operations to support the initialization of the physical resources at the destination site. The manager service can determine a dependency of a first cloud service (e.g., a deployed application) on a second cloud service (e.g., a database service). The first cloud service can include software resources hosted on a first physical resource while the second cloud service can include software resources hosted on a second physical resource of the physical resources. Because of the dependency, the first cloud service may not function correctly until the second cloud service is operating normally. Since the physical resources can perform test mode validations independently during initialization, portions of the deployed region may become available before others. In this case, the manager service can determine whether a portion of the network topology associated with the second physical resource was validated successfully and then send an indication that the first cloud service is available. The indication may be sent to an operations console or other system that configured to report the availability of services and applications in the prefab region at the destination site as they become available. For example, the indication may be used to initiate one or more user acceptance tests on the newly available first cloud service.

In some embodiments, during prefab region build operations at the prefab factory, changes may be made to the configuration of the prefab region. For example, a prefab region may need to have additional computing resources to support additional or expanded applications and/or services once delivered to the destination site. The techniques described herein can address modifications to a prefab region while it is being built in the prefab factory. The manager service can generate an updated physical build request that can be used to modify the physical resources. For example, the updated physical build request can specify the installation of an additional server rack into the prefab region at the prefab factory. As another example, one or more server devices may be replaced with a different type of server device (e.g., a device with a faster processor, additional processors, additional memory, etc.). As with the physical build request, the updated physical build request can include instructions usable to obtain, install, and/or modify the physical resources, for example by operations personnel at the prefab factory. After the modifications have been made, the manager service can deploy updated software resources to the modified physical resources. For example, the manager service can use the orchestration service and the ViBE to deploy software components of a new service to a new server rack in the prefab region. The manager service may deploy the updated software resources in response to receiving an indication that the physical resources were successfully modified.

In some embodiments, configuring the physical resources for transportation to the second data center can include generating device snapshots for one or more of the physical resources. For example, the manager service can generate a software image of each server device in the prefab region and store the software images in a datastore or similar repository. When validating the prefab region after installation at the destination site, the manger service can determine that one of the physical resources has failed. For example, a server device may have been damaged or lost during shipment to the destination site. In response, the manager service can generate instructions usable to replace the non-functional physical resource with a functional replacement (e.g., swap a non-working server device with a working replacement server device with identical physical configuration). Once the functional replacement device has been installed, the manager service can configure the replacement device using the device snapshot of the failed device. For example, the manager service can deploy an image to the replacement device to create a device that is configured and functions the same as the device that was replaced.

Figure 8:
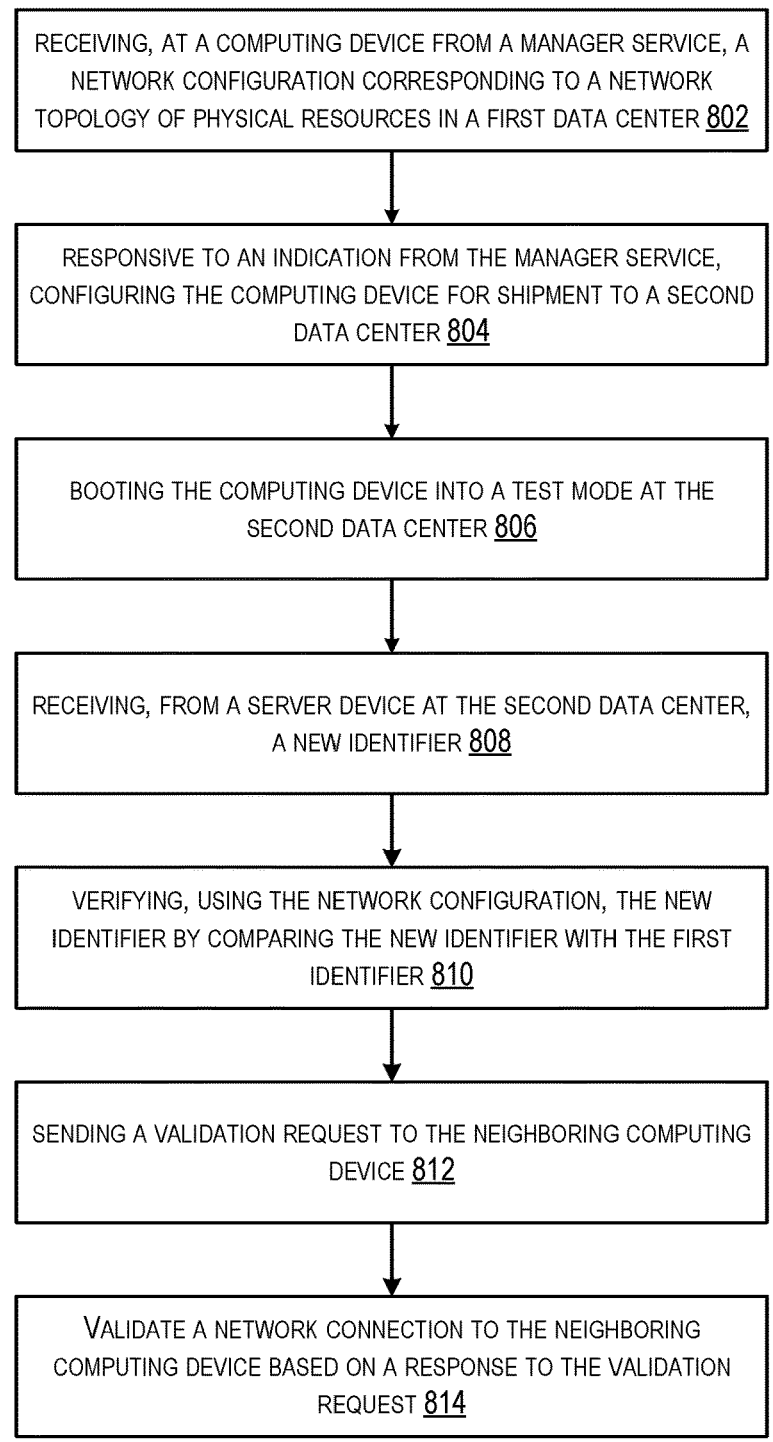
FIG. 8 is an example method for booting physical resources built at a prefab factory after delivery to a destination data center and verifying a network configuration of the physical resources, according to at least one embodiment.

FIG. 8 is an example method 800 for booting physical resources built at a prefab factory after delivery to a destination data center and verifying a network configuration of the physical resources, according to at least one embodiment. The method 800 may be performed by one or more components of a computer system, including one or more components of a computer system of a prefab region (e.g., Prefab Region 206 of FIG. 2) that are communicatively connected to a CSP hosting a manager service (e.g., manager service 212 of FIG. 2). For example, the method 800 may be performed by a computing device of a prefab region, including server device 536 of FIG. 5, DHCP server 646, or key server 642 of FIG. 6. The operations of method 800 may be performed in any suitable order, and method 800 may include more or fewer operations than those depicted in FIG. 8.

Method 800 may begin at block 802 with the computing device receiving a network configuration (e.g., network snapshot 526 of FIG. 5) from the manager service. The network configuration can include information specifying a network topology of physical resources in a first data center (e.g., prefab factory 202 of FIG. 2). The network configuration can include a first identifier (e.g., network address, hostname, etc.) associated with the computing device, a second identifier (e.g., network address, hostname, etc.) associated with a neighboring computing device, and information associating the computing device with the neighboring computing device (e.g., information specifying network connection 544 of FIG. 5). The computing device can be configured to use the network configuration to communicate over a network connection with the neighboring computing device.

At block 804, the computing device can be configured for transmission to a second data center (e.g., destination site 602 of FIG. 6). Configuring the computing device for transmission can include operations similar to those described above for blocks 710 and 712 of FIG. 7. Additionally, configuring the computing device for transmission to the second data center can include configuring the computing device to boot into a test mode during a subsequent power on sequence. At block 806, the computing device may be booted into the test mode at the second data center. For example, once the computing device and other physical resources of the prefab region have been delivered to and installed at the second data center, the computing device may be powered on and enter the test mode. In some embodiments, booting the computing device into the test mode can include booting from a boot volume stored on a SmartNIC connected to the computing device.

At block 808 the computing device can receive a new identifier. The new identifier can be received from a server device at the second data center. For example, the server device can be a device configured to act as a DHCP server at the second data center. The identifier may be a network address for the computing device. As described above, the identifier may be the same as the first identifier associated with the computing device in the prefab region at the prefab factory, since no changes to the network configuration should have occurred during transit and installation of the physical resources at the second data center.

At block 810, the computing device can verify the new identifier by comparing the new identifier with the first identifier. The computing device can obtain the first identifier from the network configuration stored at the computing device prior to transmission.

At block 812, the computing device can send a validation request to the neighboring computing device. The validation request sent according to the second identifier associated with the neighboring computing device. For example, the computing device can ping the neighboring device at a network address associated with the neighboring computing device. In response, at block 814, the computing device can validate a network connection to the neighboring computing device. The network connection can be characterized by the network configuration. In some embodiments, the validation of the network connection can include receiving a response to the validation request, which may be a validation indication from the neighboring computing device. In some embodiments, the response to the validation request may be an indication that validation request was not received by the neighboring computing device, for example a request time out indication. The validation indication can indicate that the physical networking between the computing device and the neighboring computing device has been installed correctly at the second data center. In some embodiments, once the computing device successfully validates its connection to each neighboring computing device, the computing device can send an indication to the manager service that the network connections associated with the computing device were successfully validated at the destination site.

In some embodiments, the computing device may be configured to operate as a key server in the prefab region at the second data center. Configuring the computing device for transmission to a second data center can then include encrypting a data volume of the neighboring computing device using an encryption key associated with the neighboring computing device. The encryption key may be stored at a data volume of the computing device, which can in turn be encrypted with a different encryption key (e.g., a master key). The master key may then be stored at a secure storage volume (e.g., hardware security module, trusted platform module (TPM), SmartNIC) that is connected to the computing device and that can be used to decrypt the storage volume on the computing device to retrieve and vend encryption keys to the neighboring computing device and other computing devices in the prefab region as they come online in the second data center. In some embodiments, once the computing device validates the network connection to the neighboring computing device, the computing device can obtain the master key from the secure storage volume, decrypt the data volume storing the encryption keys, and vend the encryption keys in response to key requests from the neighboring computing device or other computing devices.

In some embodiments, the computing system can determine that one or more of the computing devices at the second data center has failed or is otherwise not functioning correctly. For example, a server device of a server rack may have been damaged during transportation. To complete the installation of the prefab region at the second data center, the failed or otherwise non-functional computing device can be replaced with another device and configured with a software image of the failed device prior to the transportation of the devices to the second data center. As one example, the computing system can configure the neighboring computing device for transmission to the second data center by generating a device snapshot of the neighboring computing device. The device snapshot can include a software image of the neighboring computing device. The device snapshot may be generated by the manager service and/or other prefab services performing prefab region build operations at the prefab factory.

Once the computing devices are installed at the second data center, the computing system can determine that the neighboring computing device is non-functional. For example, the computing device can receive a response to the validation request that indicates that the neighboring computing device has been damaged or is not functioning properly. In response to this determination, the manager service can generate instructions to replace the neighboring computing device with a replacement computing device. The instructions may be usable by personnel at the second data center to make the replacement (e.g., a like-for-like swap of the device on a server rack). The manager service can then deploy the device snapshot for the neighboring computing device to the functional neighboring computing device, resulting in a device that can be identical to the failed device. The computing device can then re-send the validation request to determine the correct operation of the network connection between the computing device and the neighboring computing device.

Static Network Fabric

As described above, a prefab factory (e.g., prefab factory 102 of FIG. 1) can include a static network fabric consisting of networking infrastructure (e.g., switches, routers, cabling, etc.) designed to support various network topologies of region components built in the factory. Prefab regions with different network topologies can be quickly connected to the static network fabric according to connection plans that match the static network fabric with the physical components of the region. The static network fabric can include network cabling that terminates at set locations in the prefab factory configured for the installation of server racks. The network cabling can include multiple types and numbers of cable connectors or other terminations to support connections to different computing devices of a prefab region that is installed at the locations. For example, server racks for a first prefab region can be installed at locations in the prefab factory and connected to the static network fabric at those locations according to the specified network for the first prefab region. Subsequently (e.g., after prefab region build operations) those server racks can be removed and server racks for a second prefab region having different networking interfaces can be installed at the same locations and connected to the static network fabric according to the specified network for the second prefab region. In this way, different prefab regions can be installed at the prefab factory without modification to the static network fabric, reducing the complexity of network connections of the prefab regions within the factory and increasing the speed at which the prefab region components are installed/removed from the factory to support prefab region build operations.

Figure 9:
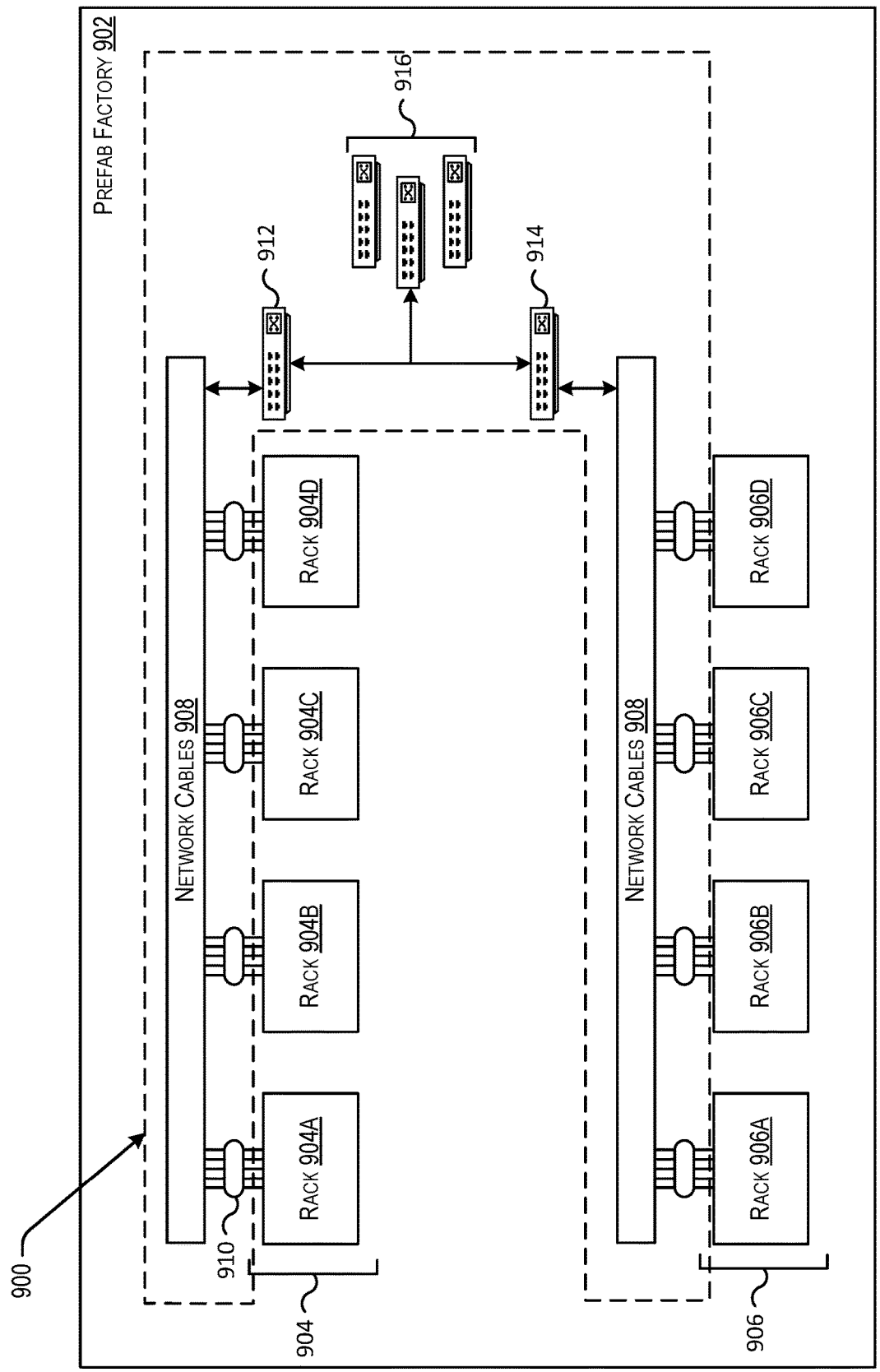
FIG. 9 is a block diagram illustrating an example static network fabric in a prefab factory, according to at least one embodiment.

FIG. 9 is a block diagram illustrating an example static network fabric 900 in a prefab factory 902, according to at least one embodiment. Prefab factory 902 may be an example of any of the prefab factories described herein, including prefab factory 102 of FIG. 1. The static network fabric 900 can include network cables 908 that are routed throughout the prefab factory. As one example, the network cables 908 may be installed in overhead cable trays that are aligned with locations for rows of server racks. In other examples, the network cables 908 may be installed to run in trays or conduits under raised flooring also aligned with locations of rows of server racks. The network cables 908 can be configured to terminate at the locations in the prefab factory 902 where server racks can be positioned when installing a prefab region. For example, a set of network cables 910 can terminate at a location for server rack 904A of Prefab Region 904.

The prefab factory can support multiple prefab regions simultaneously for prefab region build operations. As depicted in FIG. 9, prefab factory 902 can include Prefab Region 904 and Prefab Region 906, which each may be examples of other prefab regions described herein, including Prefab Region 206 of FIG. 2. Prefab Region 904 can include server racks 904A-904D. Similarly, Prefab Region 906 can include server racks 906A-906D. the computing devices of a prefab region may be communicatively connected to one another via an arrangement of network cables, including one or more of the network cables 908 and associated networking devices of the static network fabric 900. The arrangement of connected computing devices in a prefab region can be referred to as a region network. The region network for Prefab Region 904 can be different from the region network of Prefab Region 906, although in certain cases some networking devices of the static network fabric may handle traffic from both region networks. Network cables 908 can include one or more types of network cabling, and/or various combinations of types, including fiber-optic cabling, copper based cabling (e.g., Ethernet, copper coaxial, etc.). In some embodiments, the network connectivity enabled by network cables 908 may be implemented by optical and/or wireless links such as ultra-wideband technology. Although described herein with reference to physical network cabling, embodiments of the present disclosure that include optical or other wireless network connectivity are contemplated.

The set of network cables 910 terminating at the location can include multiple types of cables (e.g., fiber optic, twisted pair cabling for Ethernet or the like, coaxial, etc.) each terminating with a suitable cable termination connector. The cable termination connector may be connected to a terminal end of a network cable of the set of network cables 910. The types of cable termination connectors can include, but is not limited to, multi-fiber push on (MPO), multi-fiber pull off, small form-factor pluggable (SFP), SFP+, SFP28, quad small form-factor pluggable (QSFP), QSFP+, QSFP28, and RJ45. When a server rack is positioned at a location in the prefab factory, one or more of the set of network cables that terminate at that location may be connected to one or more computing devices of the server rack to connect the computing devices of the server rack to a region network. For example, server rack 904A can include a network switch positioned at the top of the rack (e.g., a top of rack switch).

The static network fabric 900 can also include one or more networking devices configured to support network traffic for multiple region networks simultaneously. The networking devices can be arranged in various architectures to support different levels of network traffic for the different prefab regions in the prefab factory 902. For example, the static network fabric 900 can be arranged in a three-tier architecture with aggregate switches (e.g., switches 912, 914) supporting top of rack switches in each server rack (e.g., server racks 904A-904D and server racks 906A-906D), and core switches (e.g., switches 916) supporting the aggregate switches. As another example, the static network fabric 900 can be arranged in a spine and leaf architecture with leaf switches (e.g., top of rack switches for each server rack) supporting traffic from the server devices in each server rack with spine switches (e.g., switches 912, 914, 916) supporting traffic for each of the leaf switches in the layer below.

The static network fabric 900 can form a Clos network. A Clos network topology is a non-blocking architecture with each switch of one layer of the network fabric (e.g., each leaf switch) connected to each switch of the next layer (e.g., each spine switch), providing a network path between each device and each other device and allowing traffic to be directed along available paths in the most efficient manner. For example, switches 912-916 may be spine switches of the static network fabric 900. Each of the switches 912-916 can be connected to a network cable of network cables 908 that terminates at each location, so that the set of network cables (e.g., set of network cables 910) includes a network connection to each of switches 912-916. When the network connections at the locations are connected to leaf switches (e.g., a top of rack switch of each server rack), the resulting interconnection can form a Clos network. Other topologies can be supported with suitable numbers of switches and other networking devices.

Figure 10A:
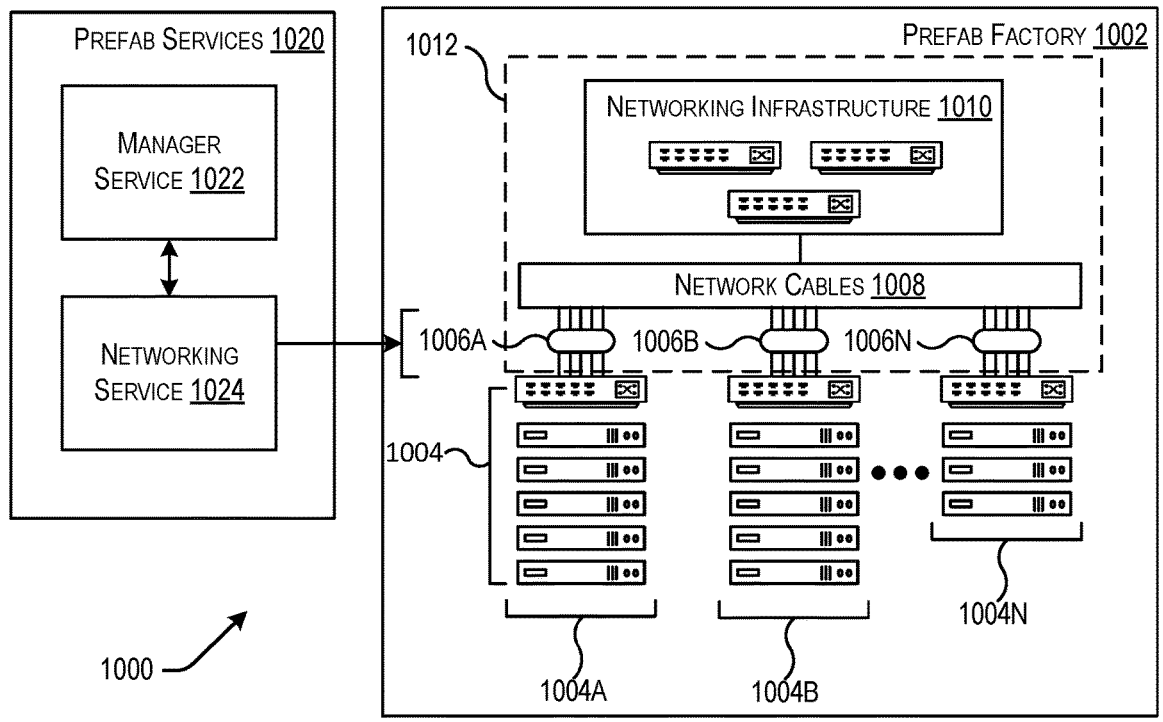
FIGS. 10A and 10B are diagrams illustrating example arrangements of physical computing resources connected to the static network fabric in a prefab factory, according to some embodiments.
Figure 10B:
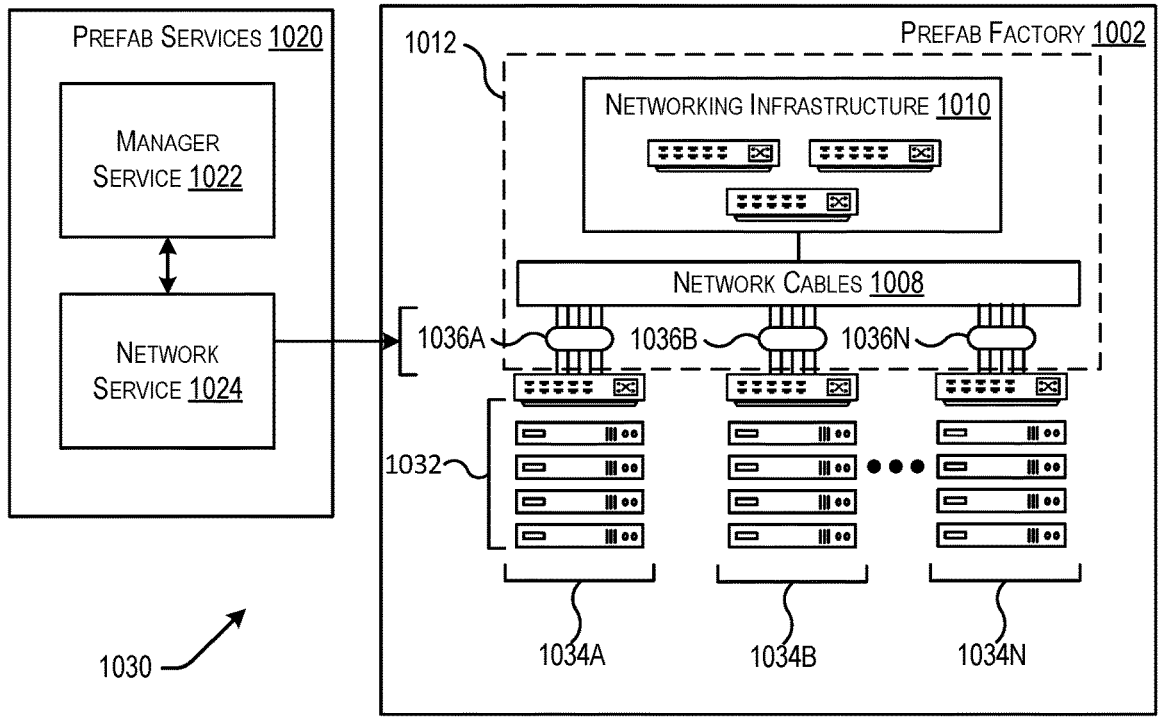

FIGS. 10A and 10B are diagrams illustrating example arrangements of physical computing resources connected to the static network fabric in a prefab factory, according to some embodiments. FIG. 10A is a diagram illustrating a CSP system 1000 that includes a prefab factory 1002 in which Prefab Region 1004 may be built. FIG. 10B is a diagram illustrating Prefab Region 1032 in prefab factory 1002. The CSP systems 1000, 1030 can include prefab services 1020, which may be examples of other prefab services described herein, including prefab services 510 of FIG. 5. Prefab services 1020 can include a manager service 1022 and a network service 1024, which may be examples of manager service 512 and network service 520 of FIG. 5, respectively. The prefab factory 1002 may be an example of any other prefab factory described herein, including prefab factory 902 of FIG. 9. The prefab factory 1002 can include static network fabric 1012, which may be an example of static network fabric 900 of FIG. 9. Static network fabric 1012 can include network cables 1008 and networking infrastructure 1010 that has one or more networking devices (e.g., switches, routers, etc.) for handling traffic among computing devices in one or more region networks.

Prefab Region 1004 can include a plurality of server racks 1004A, 1004B, through 1004N. Each server rack can have a number of computing devices, including server devices and networking devices. Each server rack 1004A-1004N can have the same or a different number of computing devices and/or different types of computing devices (e.g., server devices with different computing capabilities). For example, server rack 1004N may have fewer server devices than server rack 1004A. As part of prefab region build operations for Prefab Region 1004, server racks 1004A-1004N may be positioned at locations within prefab factory 1002. A set of network cables 1008 configured to terminate at each location (e.g., set of network cables 1006A-1006N) may then be connected to each server rack 1004A-1004N.

As a particular example, server rack 1004A of Prefab Region 1004 may be communicatively connected to the static network fabric 1012 of prefab factory 1002 by connecting a set of network cables 1006A from the network cables 1008. As described above with respect to FIG. 9, the set of network cables 1006A can include a plurality of network cables that have cable termination connector. The server devices on server rack 1004A can be communicatively connected to a network switch. For example, server rack 1004A can include 40 server devices that each have a network connection to a top of rack switch on the server rack 1004A. The connection between the server devices and a networking device of the server rack can be made prior to installing the server rack in the prefab factory. For example, server devices and networking devices of server rack 1004A may be connected while server rack 1004A is stored in a physical inventory (e.g., physical inventory 224 of FIG. 2). When server rack 1004A is installed at the corresponding location in prefab factory 1002, one or more of the set of network cables 1006A can be connected to one or more ports of the network switch to communicatively connect the server devices to a region network using the static network fabric 1012. The region network can include the network formed by computing devices of the prefab region and the portions of static network fabric 1012 that enable network connections between different server racks.

Depending on the configuration of server rack 1004A, some of the cables of the set of network cables 1006A may not be connected to the network switch of server rack 1004A. For example, the network switch may be configured to connect to another network switch of the static network fabric via a QSFP+ fiber optic connection and may not have networking ports to support twisted pair cabling or coaxial cabling. Thus, any of the cables of the set of network cables 1006A that are twisted pair cabling or coaxial cabling and have a corresponding cable termination connector will not be connected to the network switch of server rack 1004A. Similarly, a networking device of server rack 1004B can be connected to one or more cables of the set of network cables 1006B, and a networking device of server rack 1004N can be connected to one or more cables of the set of network cables 1006N.

To make the connections between the static network fabric 1012 of the prefab factory 1002 and the computing devices of Prefab Region 1004 and/or Prefab Region 1032, the manager service 1022 and network service 1024 can perform operations to generate a connection plan. The connection plan can include instructions usable (e.g., by operations personnel in the prefab factory 1002) to identify the appropriate network cables of the set of network cables at each location to connect to the server racks (e.g., server racks 1004A-1004N, server racks 1034A-1034N) and identify corresponding ports at a computing device (e.g., a top of rack switch) at which the identified cables can be connected. Server racks in the Prefab Region 1004 may connect to the static network fabric 1012 via different connections. For example, server rack 1004A may connect via one or more QSFP+ connections of the set of network cables 1006A, while server rack 1034A may connect via one or more SFP connections of the set of network cables 1036A.

To generate the connection plan, the network service 1024 can determine the configuration of the computing devices in the prefab regions and determine the static network topology of the static network fabric 1012. The configuration of the computing devices can include information specifying the physical networking connections between the server devices and networking devices on each server rack. For example, each server device on server rack 1004A may be connected to a specific, identified port on a top of rack switch on the server rack 1004A. The configuration of server rack 1004A can include information that identifies the connection between each server device and the specific port on the top of rack switch to which it is connected. The configuration of the computing devices in Prefab Region 1004 may be pre-determined, for example as part of the initial construction of each server rack in the physical inventory (e.g., physical inventory 224 of FIG. 2). The configuration can be stored at a data store accessible to network service 1024 as configuration parameters.

Similarly, the static network topology of static network fabric 1012 can specify the physical connection of the network cables 1008 to ports of switches in networking infrastructure 1010 as well as the identity and type of cables that terminate at locations in the prefab factory 1002 as part of the set of network cables at each location (e.g., set of network cables 1006A-1006N, set of network cables 1036A-1036N). Information describing the static network topology may be stored in the data store accessible to network service 1024.

As depicted in FIGS. 10A and 10B, the prefab factory 1002 may be configured to support prefab region build operations on both Prefab Region 1004 and Prefab Region 1032 simultaneously. In some embodiments, the server racks 1004A-1004N of Prefab Region 1004 may be installed at different locations than the server racks 1034A-1034N of Prefab Region 1032. In some embodiments, the server racks 1034A-1034N of Prefab Region 1032 may be installed at the same locations as used for server racks 1004A-1004N after the server racks 1004A-1004N have been configured for transmission to a destination site and removed from the prefab factory 1002. In this case, the sets of network cables 1036A-1036N may be the same as the sets of network cables 1006A-1006N used to connect server racks 1004A-1004N to static network fabric 1012 but connected to server racks 1034A-1034N according to the connection plan corresponding to Prefab Region 1032.

As described above with respect to FIG. 7, the prefab factory 1002 can support updates and other modifications to the physical resources during prefab region build operations. The static network fabric 1012 can support the installation of additional server racks for Prefab Region 1004 and/or Prefab Region 1032 according to an updated build request. If additional computing devices are added to a prefab region, the network service 1024 can generate an updated connection plan having instructions to connect the additional computing devices to the static network fabric 1012.

Figure 11:
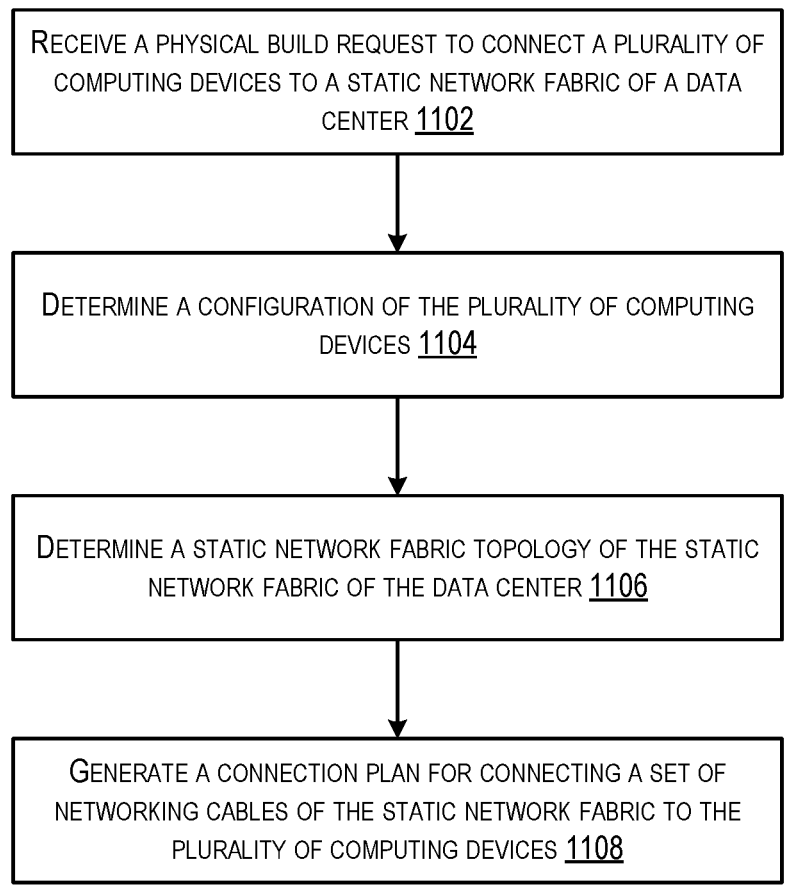
FIG. 11 is an example method for generating a connection plan to connect a plurality of computing devices to a set of networking cables of a static network fabric in a prefab factory, according to at least one embodiment.

FIG. 11 is an example method 1100 for generating a connection plan to connect a plurality of computing devices (e.g., server racks 1004A of FIG. 10) to a set of networking cables (e.g., set of networking cables 1006A of FIG. 10) of a static network fabric (e.g., static network fabric 1012 of FIG. 10) in a prefab factory (e.g., prefab factory 1002 of FIG. 10), according to at least one embodiment. The method 1100 may be performed by one or more computing devices of a CSP that host prefab services (e.g., prefab services 1020 of FIG. 10), including a network service (e.g., network service 1024).

The method 1100 may begin at block 1102 with the network service can receive a physical build request. The physical build request can specify a plurality of computing devices to connect to a static network fabric of a data center (e.g., prefab factory 1002). The physical build request may be an example of the physical build request generated by the manager service at the beginning of prefab region build operations and described above with respect to method 700 of FIG. 7. The network service may receive the physical build request from the manager service.

At block 1104, the network service can determine a configuration of the plurality of the computing devices. The configuration can specify the network connections between the plurality of computing devices. For example, the plurality of computing devices may be server devices on a server rack, each communicatively connected to a port on a top of rack switch. The configuration may therefore identify the server devices, the corresponding port of the top of rack switch to which the server devices are connected, and the network settings associated with the connections. In some embodiments, determining the configuration of the computing devices can include determining an arrangement of the network connections of the computing devices to the top of rack switch or other networking device. In some embodiments, determining the configuration of the computing devices can include obtaining configuration parameters from a data store. The configuration parameters can include information that identifies the connection between each server device and the specific port the networking device to which it is connected.

At block 1106, the network service can determine a static network fabric topology of the static network fabric of the data center. The static network topology may define the network connections between one or more networking devices (e.g., leaf switches, spine switches, aggregate switches, core switches, etc.) of the network infrastructure of the static network fabric of the prefab factory. For example, the static network topology may identify ports and devices to which each networking device is connected in the static network fabric. The static network topology may also specify one or more cable termination connectors at locations in the prefab factory. The network service can determine the configuration and the static network topology in response to receiving the physical build request. In some embodiments, determining the static network fabric topology can include obtaining a predetermined topology of the static network fabric for the data center from the data store. In some embodiments, the static network topology may correspond to a Clos network.

At block 1108, the network service can use the configuration and the static network fabric topology to generate a connection plan for connecting a set of networking cables of the static network fabric to the computing devices. The set of networking cables may be determined from the networking cables (e.g., network cables 1008) of the static network fabric that are configured to terminate at a location in the data center. Terminating at the location can include having a cable termination connector at an end of the network cable that can be connected to a computing device. The location may correspond to a position at which the computing devices may be positioned in the prefab factory for installation to support prefab region build operations. The connection plan can include instructions usable (e.g., by operations personnel) to connect each networking cable of the set of networking cables to a corresponding networking port of a networking device of the computing devices to form a region network.

In some embodiments, the network service can determine an additional configuration of additional computing devices connected to a second networking device. The additional computing devices and the second networking device may be a new server rack installed at the prefab factory to support a modification to a prefab region being built therein. The additional configuration may be similar to the configuration and may specify the network connections between the additional computing devices and the second networking device. Using the configuration of the computing devices, the additional configuration of the additional computing devices, and the static network topology, the network service can then generate an updated connection plan that has instructions to connect the additional computing devices to the static network fabric to form an updated region network with the previous installed computing devices of the prefab region.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model may require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to first be set up. In some instances, the provisioning can be done manually, a provisioning tool may be utilized to provision the resources, and/or deployment tools may be utilized to deploy the code once the infrastructure is provisioned.

Figure 12:
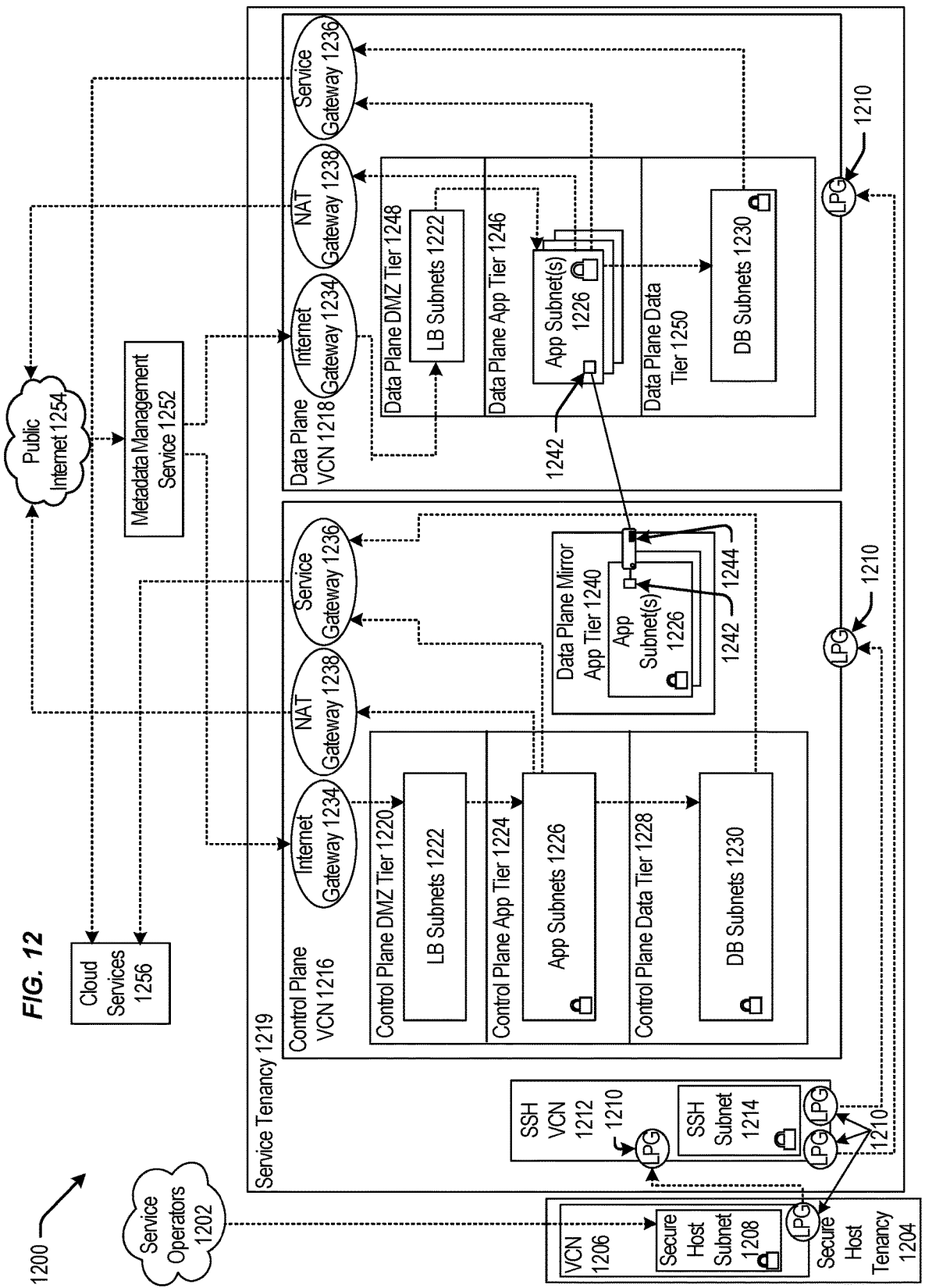
FIG. 12 is a block diagram illustrating one pattern for implementing a cloud infrastructure as a service system, according to at least one embodiment.

FIG. 12 is a block diagram 1200 illustrating an example pattern of an IaaS architecture, according to at least one embodiment. Service operators 1202 can be communicatively coupled to a secure host tenancy 1204 that can include a virtual cloud network (VCN) 1206 and a secure host subnet 1208. In some examples, the service operators 1202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1206 and/or the Internet.

The VCN 1206 can include a local peering gateway (LPG) 1210 that can be communicatively coupled to a secure shell (SSH) VCN 1212 via an LPG 1210 contained in the SSH VCN 1212. The SSH VCN 1212 can include an SSH subnet 1214, and the SSH VCN 1212 can be communicatively coupled to a control plane VCN 1216 via the LPG 1210 contained in the control plane VCN 1216. Also, the SSH VCN 1212 can be communicatively coupled to a data plane VCN 1218 via an LPG 1210. The control plane VCN 1216 and the data plane VCN 1218 can be contained in a service tenancy 1219 that can be owned and/or operated by the IaaS provider.

The control plane VCN 1216 can include a control plane demilitarized zone (DMZ) tier 1220 that acts as a perimeter network (e.g., portions of a corporate network between the corporate intranet and external networks). The DMZ-based servers may have restricted responsibilities and help keep breaches contained. Additionally, the DMZ tier 1220 can include one or more load balancer (LB) subnet(s) 1222, a control plane app tier 1224 that can include app subnet(s) 1226, a control plane data tier 1228 that can include database (DB) subnet(s) 1230 (e.g., frontend DB subnet(s) and/or backend DB subnet(s)). The LB subnet(s) 1222 contained in the control plane DMZ tier 1220 can be communicatively coupled to the app subnet(s) 1226 contained in the control plane app tier 1224 and an Internet gateway 1234 that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238. The control plane VCN 1216 can include the service gateway 1236 and the NAT gateway 1238.

The control plane VCN 1216 can include a data plane mirror app tier 1240 that can include app subnet(s) 1226. The app subnet(s) 1226 contained in the data plane mirror app tier 1240 can include a virtual network interface controller (VNIC) 1242 that can execute a compute instance 1244. The compute instance 1244 can communicatively couple the app subnet(s) 1226 of the data plane mirror app tier 1240 to app subnet(s) 1226 that can be contained in a data plane app tier 1246.

The data plane VCN 1218 can include the data plane app tier 1246, a data plane DMZ tier 1248, and a data plane data tier 1250. The data plane DMZ tier 1248 can include LB subnet(s) 1222 that can be communicatively coupled to the app subnet(s) 1226 of the data plane app tier 1246 and the Internet gateway 1234 of the data plane VCN 1218. The app subnet(s) 1226 can be communicatively coupled to the service gateway 1236 of the data plane VCN 1218 and the NAT gateway 1238 of the data plane VCN 1218. The data plane data tier 1250 can also include the DB subnet(s) 1230 that can be communicatively coupled to the app subnet(s) 1226 of the data plane app tier 1246.

The Internet gateway 1234 of the control plane VCN 1216 and of the data plane VCN 1218 can be communicatively coupled to a metadata management service 1252 that can be communicatively coupled to public Internet 1254. Public Internet 1254 can be communicatively coupled to the NAT gateway 1238 of the control plane VCN 1216 and of the data plane VCN 1218. The service gateway 1236 of the control plane VCN 1216 and of the data plane VCN 1218 can be communicatively couple to cloud services 1256.

In some examples, the service gateway 1236 of the control plane VCN 1216 or of the data plane VCN 1218 can make application programming interface (API) calls to cloud services 1256 without going through public Internet 1254. The API calls to cloud services 1256 from the service gateway 1236 can be one-way: the service gateway 1236 can make API calls to cloud services 1256, and cloud services 1256 can send requested data to the service gateway 1236. But, cloud services 1256 may not initiate API calls to the service gateway 1236.

In some examples, the secure host tenancy 1204 can be directly connected to the service tenancy 1219, which may be otherwise isolated. The secure host subnet 1208 can communicate with the SSH subnet 1214 through an LPG 1210 that may enable two-way communication over an otherwise isolated system. Connecting the secure host subnet 1208 to the SSH subnet 1214 may give the secure host subnet 1208 access to other entities within the service tenancy 1219.

The control plane VCN 1216 may allow users of the service tenancy 1219 to set up or otherwise provision desired resources. Desired resources provisioned in the control plane VCN 1216 may be deployed or otherwise used in the data plane VCN 1218. In some examples, the control plane VCN 1216 can be isolated from the data plane VCN 1218, and the data plane mirror app tier 1240 of the control plane VCN 1216 can communicate with the data plane app tier 1246 of the data plane VCN 1218 via VNICs 1242 that can be contained in the data plane mirror app tier 1240 and the data plane app tier 1246.

In some examples, users of the system, or customers, can make requests, for example create, read, update, or delete (CRUD) operations, through public Internet 1254 that can communicate the requests to the metadata management service 1252. The metadata management service 1252 can communicate the request to the control plane VCN 1216 through the Internet gateway 1234. The request can be received by the LB subnet(s) 1222 contained in the control plane DMZ tier 1220. The LB subnet(s) 1222 may determine that the request is valid, and in response to this determination, the LB subnet(s) 1222 can transmit the request to app subnet(s) 1226 contained in the control plane app tier 1224. If the request is validated and requires a call to public Internet 1254, the call to public Internet 1254 may be transmitted to the NAT gateway 1238 that can make the call to public Internet 1254. Memory that may be desired to be stored by the request can be stored in the DB subnet(s) 1230.

In some examples, the data plane mirror app tier 1240 can facilitate direct communication between the control plane VCN 1216 and the data plane VCN 1218. For example, changes, updates, or other suitable modifications to configuration may be desired to be applied to the resources contained in the data plane VCN 1218. Via a VNIC 1242, the control plane VCN 1216 can directly communicate with, and can thereby execute the changes, updates, or other suitable modifications to configuration to, resources contained in the data plane VCN 1218.

In some embodiments, the control plane VCN 1216 and the data plane VCN 1218 can be contained in the service tenancy 1219. In this case, the user, or the customer, of the system may not own or operate either the control plane VCN 1216 or the data plane VCN 1218. Instead, the IaaS provider may own or operate the control plane VCN 1216 and the data plane VCN 1218, both of which may be contained in the service tenancy 1219. This embodiment can enable isolation of networks that may prevent users or customers from interacting with other users', or other customers', resources. Also, this embodiment may allow users or customers of the system to store databases privately without needing to rely on public Internet 1254, which may not have a desired level of threat prevention, for storage.

In other embodiments, the LB subnet(s) 1222 contained in the control plane VCN 1216 can be configured to receive a signal from the service gateway 1236. In this embodiment, the control plane VCN 1216 and the data plane VCN 1218 may be configured to be called by a customer of the IaaS provider without calling public Internet 1254. Customers of the IaaS provider may desire this embodiment since database(s) that the customers use may be controlled by the IaaS provider and may be stored on the service tenancy 1219, which may be isolated from public Internet 1254.

Figure 13:
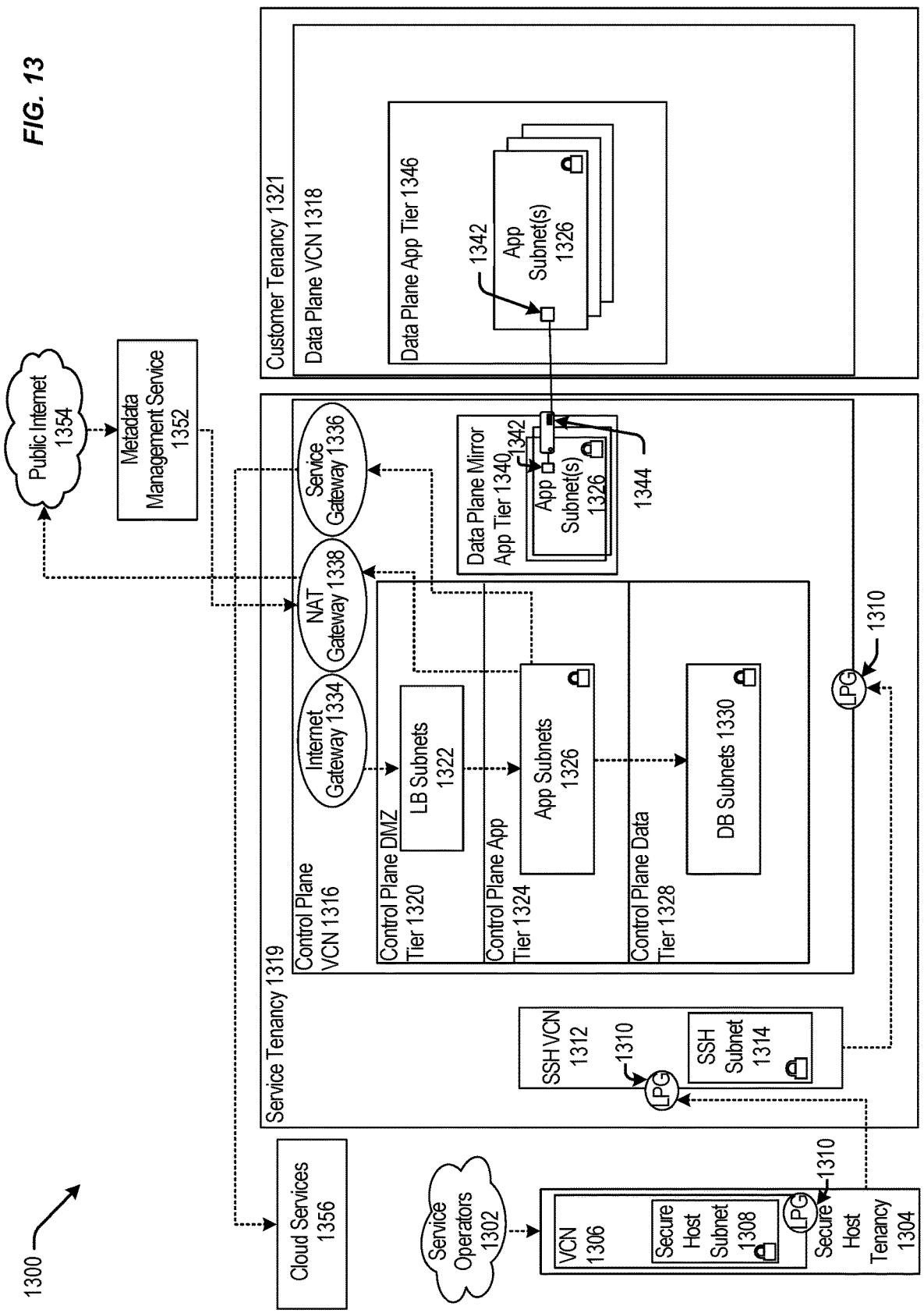
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1202 of FIG. 12) can be communicatively coupled to a secure host tenancy 1304 (e.g., the secure host tenancy 1204 of FIG. 12) that can include a virtual cloud network (VCN) 1306 (e.g., the VCN 1206 of FIG. 12) and a secure host subnet 1308 (e.g., the secure host subnet 1208 of FIG. 12). The VCN 1306 can include a local peering gateway (LPG) 1310 (e.g., the LPG 1210 of FIG. 12) that can be communicatively coupled to a secure shell (SSH) VCN 1312 (e.g., the SSH VCN 1212 of FIG. 12) via an LPG 1210 contained in the SSH VCN 1312. The SSH VCN 1312 can include an SSH subnet 1314 (e.g., the SSH subnet 1214 of FIG. 12), and the SSH VCN 1312 can be communicatively coupled to a control plane VCN 1316 (e.g., the control plane VCN 1216 of FIG. 12) via an LPG 1310 contained in the control plane VCN 1316. The control plane VCN 1316 can be contained in a service tenancy 1319 (e.g., the service tenancy 1219 of FIG. 12), and the data plane VCN 1318 (e.g., the data plane VCN 1218 of FIG. 12) can be contained in a customer tenancy 1321 that may be owned or operated by users, or customers, of the system.

The control plane VCN 1316 can include a control plane DMZ tier 1320 (e.g., the control plane DMZ tier 1220 of FIG. 12) that can include LB subnet(s) 1322 (e.g., LB subnet(s) 1222 of FIG. 12), a control plane app tier 1324 (e.g., the control plane app tier 1224 of FIG. 12) that can include app subnet(s) 1326 (e.g., app subnet(s) 1226 of FIG. 12), a control plane data tier 1328 (e.g., the control plane data tier 1228 of FIG. 12) that can include database (DB) subnet(s) 1330 (e.g., similar to DB subnet(s) 1230 of FIG. 12). The LB subnet(s) 1322 contained in the control plane DMZ tier 1320 can be communicatively coupled to the app subnet(s) 1326 contained in the control plane app tier 1324 and an Internet gateway 1334 (e.g., the Internet gateway 1234 of FIG. 12) that can be contained in the control plane VCN 1316, and the app subnet(s) 1326 can be communicatively coupled to the DB subnet(s) 1330 contained in the control plane data tier 1328 and a service gateway 1336 (e.g., the service gateway of FIG. 12) and a network address translation (NAT) gateway 1338 (e.g., the NAT gateway 1238 of FIG. 12). The control plane VCN 1316 can include the service gateway 1336 and the NAT gateway 1338.

The control plane VCN 1316 can include a data plane mirror app tier 1340 (e.g., the data plane mirror app tier 1240 of FIG. 12) that can include app subnet(s) 1326. The app subnet(s) 1326 contained in the data plane mirror app tier 1340 can include a virtual network interface controller (VNIC) 1342 (e.g., the VNIC of 1242) that can execute a compute instance 1344 (e.g., similar to the compute instance 1244 of FIG. 12). The compute instance 1344 can facilitate communication between the app subnet(s) 1326 of the data plane mirror app tier 1340 and the app subnet(s) 1326 that can be contained in a data plane app tier 1346 (e.g., the data plane app tier 1246 of FIG. 12) via the VNIC 1342 contained in the data plane mirror app tier 1340 and the VNIC 1342 contained in the data plane app tier 1346.

The Internet gateway 1334 contained in the control plane VCN 1316 can be communicatively coupled to a metadata management service 1352 (e.g., the metadata management service 1252 of FIG. 12) that can be communicatively coupled to public Internet 1354 (e.g., public Internet 1254 of FIG. 12). Public Internet 1354 can be communicatively coupled to the NAT gateway 1338 contained in the control plane VCN 1316. The service gateway 1336 contained in the control plane VCN 1316 can be communicatively couple to cloud services 1356 (e.g., cloud services 1256 of FIG. 12).

In some examples, the data plane VCN 1318 can be contained in the customer tenancy 1321. In this case, the IaaS provider may provide the control plane VCN 1316 for each customer, and the IaaS provider may, for each customer, set up a unique compute instance 1344 that is contained in the service tenancy 1319. Each compute instance 1344 may allow communication between the control plane VCN 1316, contained in the service tenancy 1319, and the data plane VCN 1318 that is contained in the customer tenancy 1321. The compute instance 1344 may allow resources, that are provisioned in the control plane VCN 1316 that is contained in the service tenancy 1319, to be deployed or otherwise used in the data plane VCN 1318 that is contained in the customer tenancy 1321.

In other examples, the customer of the IaaS provider may have databases that live in the customer tenancy 1321. In this example, the control plane VCN 1316 can include the data plane mirror app tier 1340 that can include app subnet(s) 1326. The data plane mirror app tier 1340 can reside in the data plane VCN 1318, but the data plane mirror app tier 1340 may not live in the data plane VCN 1318. That is, the data plane mirror app tier 1340 may have access to the customer tenancy 1321, but the data plane mirror app tier 1340 may not exist in the data plane VCN 1318 or be owned or operated by the customer of the IaaS provider. The data plane mirror app tier 1340 may be configured to make calls to the data plane VCN 1318 but may not be configured to make calls to any entity contained in the control plane VCN 1316. The customer may desire to deploy or otherwise use resources in the data plane VCN 1318 that are provisioned in the control plane VCN 1316, and the data plane mirror app tier 1340 can facilitate the desired deployment, or other usage of resources, of the customer.

In some embodiments, the customer of the IaaS provider can apply filters to the data plane VCN 1318. In this embodiment, the customer can determine what the data plane VCN 1318 can access, and the customer may restrict access to public Internet 1354 from the data plane VCN 1318. The IaaS provider may not be able to apply filters or otherwise control access of the data plane VCN 1318 to any outside networks or databases. Applying filters and controls by the customer onto the data plane VCN 1318, contained in the customer tenancy 1321, can help isolate the data plane VCN 1318 from other customers and from public Internet 1354.

In some embodiments, cloud services 1356 can be called by the service gateway 1336 to access services that may not exist on public Internet 1354, on the control plane VCN 1316, or on the data plane VCN 1318. The connection between cloud services 1356 and the control plane VCN 1316 or the data plane VCN 1318 may not be live or continuous. Cloud services 1356 may exist on a different network owned or operated by the IaaS provider. Cloud services 1356 may be configured to receive calls from the service gateway 1336 and may be configured to not receive calls from public Internet 1354. Some cloud services 1356 may be isolated from other cloud services 1356, and the control plane VCN 1316 may be isolated from cloud services 1356 that may not be in the same region as the control plane VCN 1316. For example, the control plane VCN 1316 may be located in "Region 1," and cloud service "Deployment 12," may be located in Region 1 and in "Region 2." If a call to Deployment 12 is made by the service gateway 1336 contained in the control plane VCN 1316 located in Region 1, the call may be transmitted to Deployment 12 in Region 1. In this example, the control plane VCN 1316, or Deployment 12 in Region 1, may not be communicatively coupled to, or otherwise in communication with, Deployment 12 in Region 2.

Figure 14:
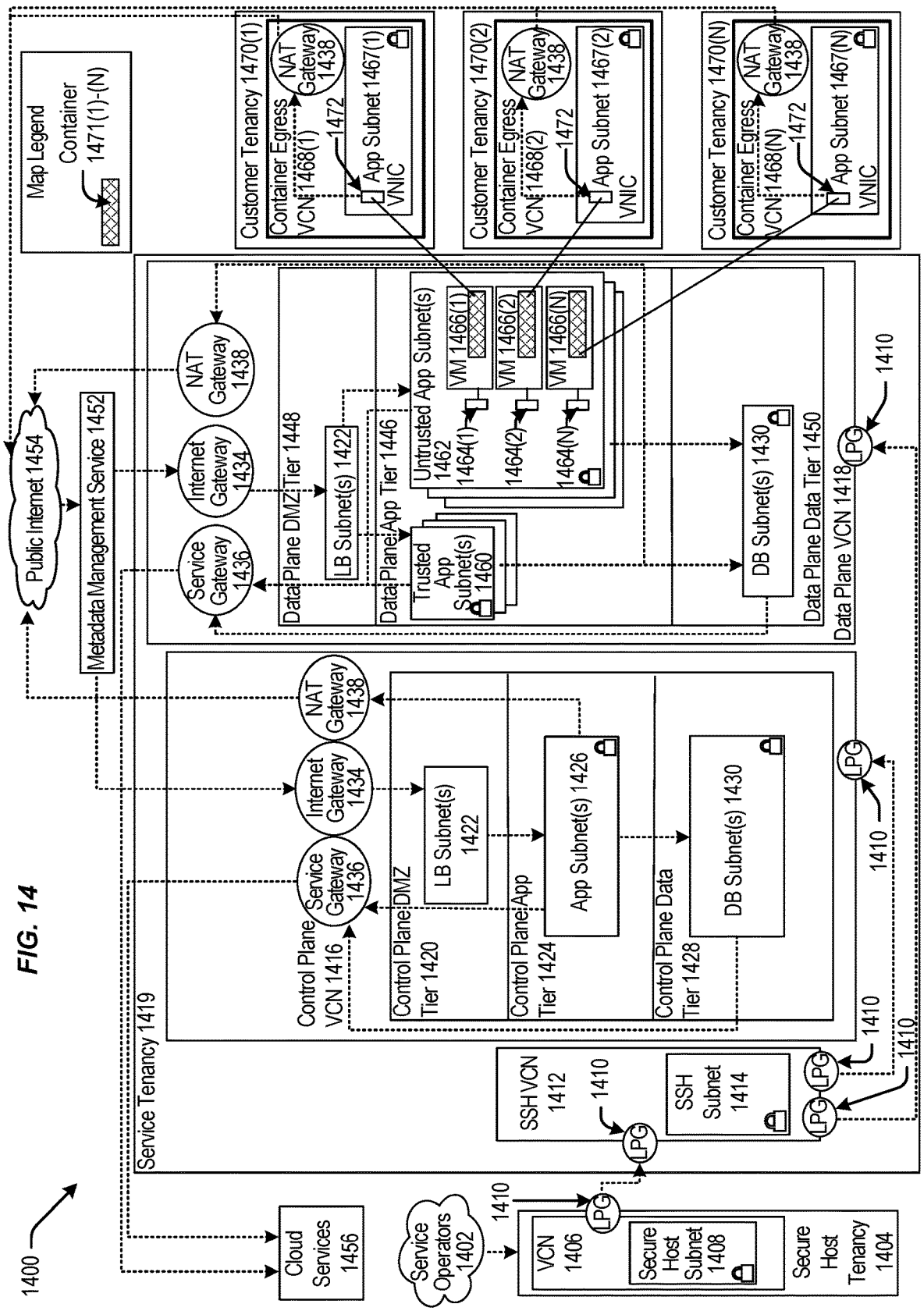
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1202 of FIG. 12) can be communicatively coupled to a secure host tenancy 1404 (e.g., the secure host tenancy 1204 of FIG. 12) that can include a virtual cloud network (VCN) 1406 (e.g., the VCN 1206 of FIG. 12) and a secure host subnet 1408 (e.g., the secure host subnet 1208 of FIG. 12). The VCN 1406 can include an LPG 1410 (e.g., the LPG 1210 of FIG. 12) that can be communicatively coupled to an SSH VCN 1412 (e.g., the SSH VCN 1212 of FIG. 12) via an LPG 1410 contained in the SSH VCN 1412. The SSH VCN 1412 can include an SSH subnet 1414 (e.g., the SSH subnet 1214 of FIG. 12), and the SSH VCN 1412 can be communicatively coupled to a control plane VCN 1416 (e.g., the control plane VCN 1216 of FIG. 12) via an LPG 1410 contained in the control plane VCN 1416 and to a data plane VCN 1418 (e.g., the data plane 1218 of FIG. 12) via an LPG 1410 contained in the data plane VCN 1418. The control plane VCN 1416 and the data plane VCN 1418 can be contained in a service tenancy 1419 (e.g., the service tenancy 1219 of FIG. 12).

The control plane VCN 1416 can include a control plane DMZ tier 1420 (e.g., the control plane DMZ tier 1220 of FIG. 12) that can include load balancer (LB) subnet(s) 1422 (e.g., LB subnet(s) 1222 of FIG. 12), a control plane app tier 1424 (e.g., the control plane app tier 1224 of FIG. 12) that can include app subnet(s) 1426 (e.g., similar to app subnet(s) 1226 of FIG. 12), a control plane data tier 1428 (e.g., the control plane data tier 1228 of FIG. 12) that can include DB subnet(s) 1430. The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1234 of FIG. 12) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 12) and a network address translation (NAT) gateway 1438 (e.g., the NAT gateway 1238 of FIG. 12). The control plane VCN 1416 can include the service gateway 1436 and the NAT gateway 1438.

The data plane VCN 1418 can include a data plane app tier 1446 (e.g., the data plane app tier 1246 of FIG. 12), a data plane DMZ tier 1448 (e.g., the data plane DMZ tier 1248 of FIG. 12), and a data plane data tier 1450 (e.g., the data plane data tier 1250 of FIG. 12). The data plane DMZ tier 1448 can include LB subnet(s) 1422 that can be communicatively coupled to trusted app subnet(s) 1460 and untrusted app subnet(s) 1462 of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include one or more primary VNICs 1464(1)-(N) that can be communicatively coupled to tenant virtual machines (VMs) 1466(1)-(N). Each tenant VM 1466(1)-(N) can be communicatively coupled to a respective app subnet 1467(1)-(N) that can be contained in respective container egress VCNs 1468(1)-(N) that can be contained in respective customer tenancies 1470(1)-(N). Respective secondary VNICs 1472(1)-(N) can facilitate communication between the untrusted app subnet(s) 1462 contained in the data plane VCN 1418 and the app subnet contained in the container egress VCNs 1468(1)-(N). Each container egress VCNs 1468(1)-(N) can include a NAT gateway 1438 that can be communicatively coupled to public Internet 1454 (e.g., public Internet 1254 of FIG. 12).

The Internet gateway 1434 contained in the control plane VCN 1416 and contained in the data plane VCN 1418 can be communicatively coupled to a metadata management service 1452 (e.g., the metadata management system 1252 of FIG. 12) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some embodiments, the data plane VCN 1418 can be integrated with customer tenancies 1470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1446. Code to run the function may be executed in the VMs 1466(1)-(N), and the code may not be configured to run anywhere else on the data plane VCN 1418. Each VM 1466(1)-(N) may be connected to one customer tenancy 1470. Respective containers 1471(1)-(N) contained in the VMs 1466(1)-(N) may be configured to run the code. In this case, there can be a dual isolation (e.g., the containers 1471(1)-(N) running code, where the containers 1471(1)-(N) may be contained in at least the VM 1466(1)-(N) that are contained in the untrusted app subnet(s) 1462), which may help prevent incorrect or otherwise undesirable code from damaging the network of the IaaS provider or from damaging a network of a different customer. The containers 1471(1)-(N) may be communicatively coupled to the customer tenancy 1470 and may be configured to transmit or receive data from the customer tenancy 1470. The containers 1471(1)-(N) may not be configured to transmit or receive data from any other entity in the data plane VCN 1418. Upon completion of running the code, the IaaS provider may kill or otherwise dispose of the containers 1471(1)-(N).

In some embodiments, the trusted app subnet(s) 1460 may run code that may be owned or operated by the IaaS provider. In this embodiment, the trusted app subnet(s) 1460 may be communicatively coupled to the DB subnet(s) 1430 and be configured to execute CRUD operations in the DB subnet(s) 1430. The untrusted app subnet(s) 1462 may be communicatively coupled to the DB subnet(s) 1430, but in this embodiment, the untrusted app subnet(s) may be configured to execute read operations in the DB subnet(s) 1430. The containers 1471(1)-(N) that can be contained in the VM 1466(1)-(N) of each customer and that may run code from the customer may not be communicatively coupled with the DB subnet(s) 1430.

In other embodiments, the control plane VCN 1416 and the data plane VCN 1418 may not be directly communicatively coupled. In this embodiment, there may be no direct communication between the control plane VCN 1416 and the data plane VCN 1418. However, communication can occur indirectly through at least one method. An LPG 1410 may be established by the IaaS provider that can facilitate communication between the control plane VCN 1416 and the data plane VCN 1418. In another example, the control plane VCN 1416 or the data plane VCN 1418 can make a call to cloud services 1456 via the service gateway 1436. For example, a call to cloud services 1456 from the control plane VCN 1416 can include a request for a service that can communicate with the data plane VCN 1418.

Figure 15:
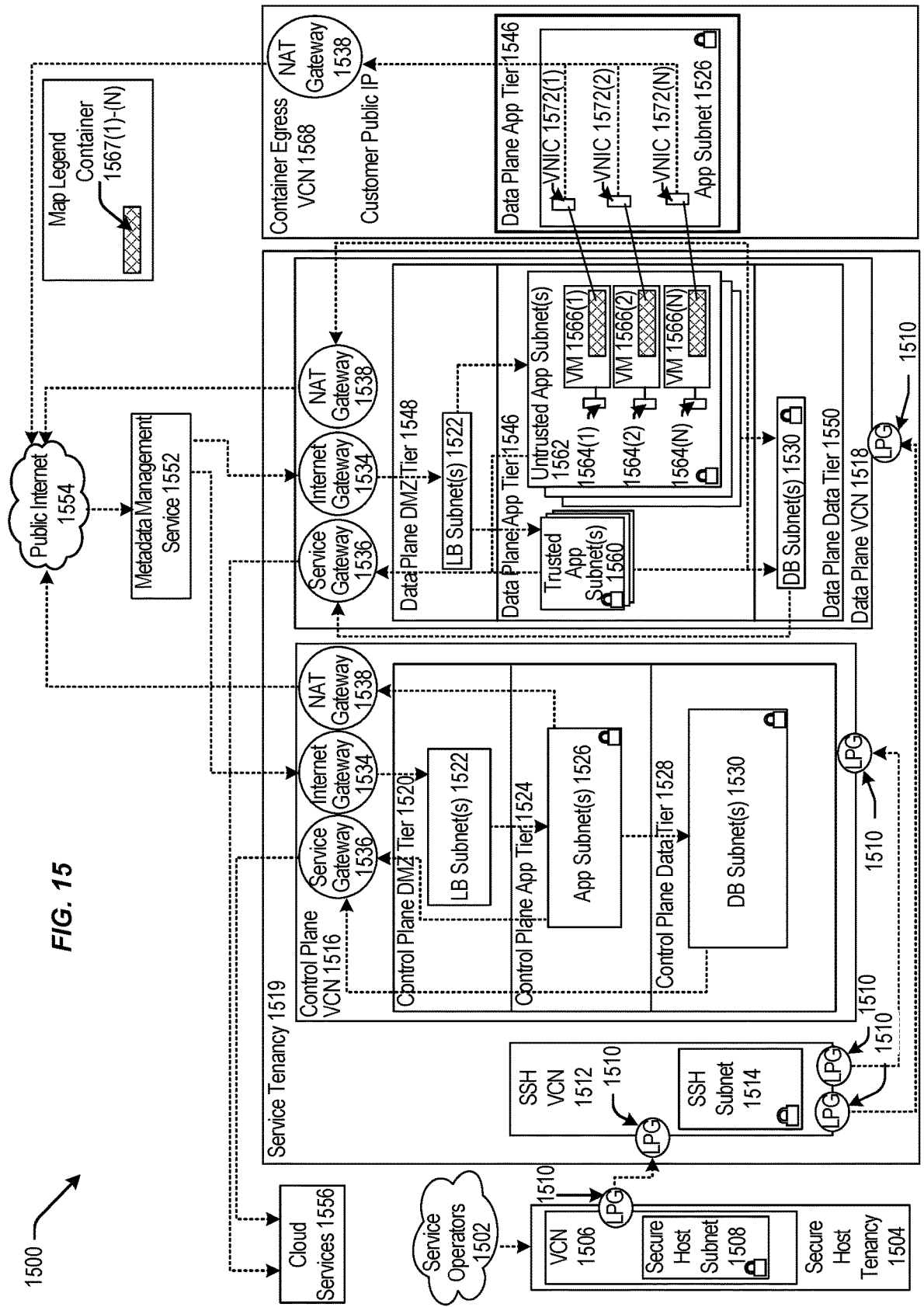
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g., service operators 1202 of FIG. 12) can be communicatively coupled to a secure host tenancy 1504 (e.g., the secure host tenancy 1204 of FIG. 12) that can include a virtual cloud network (VCN) 1506 (e.g., the VCN 1206 of FIG. 12) and a secure host subnet 1508 (e.g., the secure host subnet 1208 of FIG. 12). The VCN 1506 can include an LPG 1510 (e.g., the LPG 1210 of FIG. 12) that can be communicatively coupled to an SSH VCN 1512 (e.g., the SSH VCN 1212 of FIG. 12) via an LPG 1510 contained in the SSH VCN 1512. The SSH VCN 1512 can include an SSH subnet 1514 (e.g., the SSH subnet 1214 of FIG. 12), and the SSH VCN 1512 can be communicatively coupled to a control plane VCN 1516 (e.g., the control plane VCN 1216 of FIG. 12) via an LPG 1510 contained in the control plane VCN 1516 and to a data plane VCN 1518 (e.g., the data plane 1218 of FIG. 12) via an LPG 1510 contained in the data plane VCN 1518. The control plane VCN 1516 and the data plane VCN 1518 can be contained in a service tenancy 1519 (e.g., the service tenancy 1219 of FIG. 12).

The control plane VCN 1516 can include a control plane DMZ tier 1520 (e.g., the control plane DMZ tier 1220 of FIG. 12) that can include LB subnet(s) 1522 (e.g., LB subnet(s) 1222 of FIG. 12), a control plane app tier 1524 (e.g., the control plane app tier 1224 of FIG. 12) that can include app subnet(s) 1526 (e.g., app subnet(s) 1226 of FIG. 12), a control plane data tier 1528 (e.g., the control plane data tier 1228 of FIG. 12) that can include DB subnet(s) 1530 (e.g., DB subnet(s) 1430 of FIG. 14). The LB subnet(s) 1522 contained in the control plane DMZ tier 1520 can be communicatively coupled to the app subnet(s) 1526 contained in the control plane app tier 1524 and to an Internet gateway 1534 (e.g., the Internet gateway 1234 of FIG. 12) that can be contained in the control plane VCN 1516, and the app subnet(s) 1526 can be communicatively coupled to the DB subnet(s) 1530 contained in the control plane data tier 1528 and to a service gateway 1536 (e.g., the service gateway of FIG. 12) and a network address translation (NAT) gateway 1538 (e.g., the NAT gateway 1238 of FIG. 12). The control plane VCN 1516 can include the service gateway 1536 and the NAT gateway 1538.

The data plane VCN 1518 can include a data plane app tier 1546 (e.g., the data plane app tier 1246 of FIG. 12), a data plane DMZ tier 1548 (e.g., the data plane DMZ tier 1248 of FIG. 12), and a data plane data tier 1550 (e.g., the data plane data tier 1250 of FIG. 12). The data plane DMZ tier 1548 can include LB subnet(s) 1522 that can be communicatively coupled to trusted app subnet(s) 1560 (e.g., trusted app subnet(s) 1460 of FIG. 14) and untrusted app subnet(s) 1562 (e.g., untrusted app subnet(s) 1462 of FIG. 14) of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include primary VNICs 1564(1)-(N) that can be communicatively coupled to tenant virtual machines (VMs) 1566(1)-(N) residing within the untrusted app subnet(s) 1562. Each tenant VM 1566(1)-(N) can run code in a respective container 1567(1)-(N), and be communicatively coupled to an app subnet 1526 that can be contained in a data plane app tier 1546 that can be contained in a container egress VCN 1568. Respective secondary VNICs 1572(1)-(N) can facilitate communication between the untrusted app subnet(s) 1562 contained in the data plane VCN 1518 and the app subnet contained in the container egress VCN 1568. The container egress VCN can include a NAT gateway 1538 that can be communicatively coupled to public Internet 1554 (e.g., public Internet 1254 of FIG. 12).

The Internet gateway 1534 contained in the control plane VCN 1516 and contained in the data plane VCN 1518 can be communicatively coupled to a metadata management service 1552 (e.g., the metadata management system 1252 of FIG. 12) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some examples, the pattern illustrated by the architecture of block diagram 1500 of FIG. 15 may be considered an exception to the pattern illustrated by the architecture of block diagram 1400 of FIG. 14 and may be desirable for a customer of the IaaS provider if the IaaS provider cannot directly communicate with the customer (e.g., a disconnected region). The respective containers 1567(1)-(N) that are contained in the VMs 1566(1)-(N) for each customer can be accessed in real-time by the customer. The containers 1567(1)-(N) may be configured to make calls to respective secondary VNICs 1572(1)-(N) contained in app subnet(s) 1526 of the data plane app tier 1546 that can be contained in the container egress VCN 1568. The secondary VNICs 1572(1)-(N) can transmit the calls to the NAT gateway 1538 that may transmit the calls to public Internet 1554. In this example, the containers 1567(1)-(N) that can be accessed in real-time by the customer can be isolated from the control plane VCN 1516 and can be isolated from other entities contained in the data plane VCN 1518. The containers 1567(1)-(N) may also be isolated from resources from other customers.

In other examples, the customer can use the containers 1567(1)-(N) to call cloud services 1556. In this example, the customer may run code in the containers 1567(1)-(N) that requests a service from cloud services 1556. The containers 1567(1)-(N) can transmit this request to the secondary VNICs 1572(1)-(N) that can transmit the request to the NAT gateway that can transmit the request to public Internet 1554. Public Internet 1554 can transmit the request to LB subnet(s) 1522 contained in the control plane VCN 1516 via the Internet gateway 1534. In response to determining the request is valid, the LB subnet(s) can transmit the request to app subnet(s) 1526 that can transmit the request to cloud services 1556 via the service gateway 1536.

It should be appreciated that IaaS architectures 1200, 1300, 1400, 1500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 16:
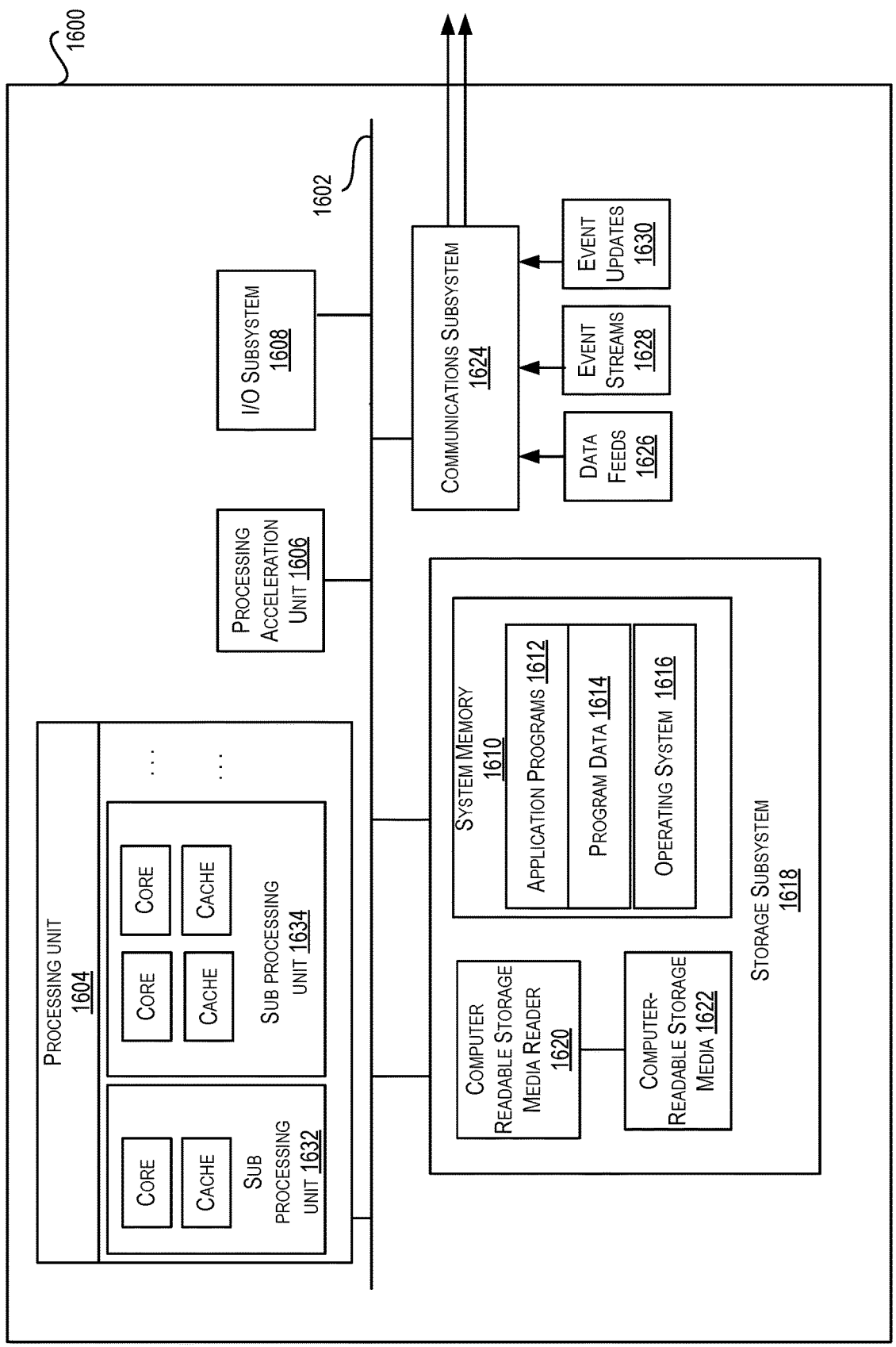
FIG. 16 is a block diagram illustrating an example computer system, according to at least one embodiment.

FIG. 16 illustrates an example computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that provides a tangible non-transitory computer-readable storage medium for storing software and data constructs that provide the functionality of the embodiments described in this disclosure. The software can include programs, code, instructions, scripts, etc., that when executed by one or more cores or processors of processing unit 1604 provide the functionality described above. Storage subsystem 1618 may also provide a repository for storing data used in accordance with the present disclosure.

As depicted in the example in FIG. 16, storage subsystem 1618 can include various components including a system memory 1610, computer-readable storage media 1622, and a computer readable storage media reader 1620. System memory 1610 may store program instructions that are loadable and executable by processing unit 1604. System memory 1610 may also store data that is used during the execution of the instructions and/or data that is generated during the execution of the program instructions. Various different kinds of programs may be loaded into system memory 1610 including but not limited to client applications, Web browsers, mid-tier applications, relational database management systems (RDBMS), virtual machines, containers, etc.

System memory 1610 may also store an operating system 1616. Examples of operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1600 executes one or more virtual machines, the virtual machines along with their guest operating systems (GOSs) may be loaded into system memory 1610 and executed by one or more processors or cores of processing unit 1604.

System memory 1610 can come in different configurations depending upon the type of computer system 1600. For example, system memory 1610 may be volatile memory (such as random access memory (RAM)) and/or non-volatile memory (such as read-only memory (ROM), flash memory, etc.). Different types of RAM configurations may be provided including a static random access memory (SRAM), a dynamic random access memory (DRAM), and others. In some implementations, system memory 1610 may include a basic input/output system (BIOS) containing basic routines that help to transfer information between elements within computer system 1600, such as during start-up.

Computer-readable storage media 1622 may represent remote, local, fixed, and/or removable storage devices plus storage media for temporarily and/or more permanently containing, storing, computer-readable information for use by computer system 1600 including instructions executable by processing unit 1604 of computer system 1600.

Computer-readable storage media 1622 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1600.

Machine-readable instructions executable by one or more processors or cores of processing unit 1604 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, at a computing device from a manager service, a network configuration corresponding to a network topology of physical resources in a first data center, the network configuration comprising a first identifier associated with the computing device, a second identifier associated with a neighboring computing device, and information associating the computing device with the neighboring computing device, and the physical resources comprising the computing device and the neighboring computing device;
   receiving, from the manager service, an indication;
   responsive to the indication from the manager service, configuring the computing device for shipping to a second data center;
   booting the computing device into a test mode at the second data center;
   receiving, by the computing device from a server device at the second data center, a new identifier;
   verifying, by the computing device using the network configuration, the new identifier by comparing the new identifier with the first identifier;
   sending, by the computing device, a validation request to the neighboring computing device, the validation request sent according to the second identifier associated with the neighboring computing device; and
   validating, by the computing device, a network connection to the neighboring computing device based on a response to the validation request, wherein the network connection is characterized by the network configuration.

2. The method of claim 1, wherein configuring the computing device for shipping to a second data center comprises:
   encrypting, using a second encryption key associated with the neighboring computing device, a second data volume of the neighboring computing device;
   storing, in a first data volume of the computing device, the second encryption key;
   encrypting, using a first encryption key associated with the computing device, the first data volume of the computing device; and
   storing the first encryption key at a secure storage volume communicatively connected to the computing device.

3. The method of claim 2, wherein the response to the validation request comprises a validation indication received from the neighboring computing device, and further comprising:
   responsive to the validation indication, obtaining, by the computing device, the first encryption key from the secure storage volume;
   decrypting the first data volume of the computing device;
   receiving a key request from the neighboring computing device;
   responsive to the key request, obtaining, by the computing device, the second encryption key from the first data volume; and
   sending the second encryption key to the neighboring computing device.

4. The method of claim 2, wherein storing the first encryption key at the secure storage volume communicatively connected to the computing device comprises storing the first encryption key at a smart network interface card connected to the computing device.

5. The method of claim 2, wherein storing the first encryption key at the secure storage volume communicatively connected to the computing device comprises storing the first encryption key at a hardware security module connected to the computing device.

6. The method of claim 1, further comprising:
   configuring the neighboring computing device for shipping to the second data center by at least generating, by the manager service, a device snapshot comprising a software image of the neighboring computing device;
   determining, based at least in part on the response to the validation request, that the neighboring computing device is non-functional;
   based at least in part on the determination that the neighboring computing device is non-functional, generating, by the manager service, instructions usable to replace the neighboring computing device with a functional neighboring computing device at the second data center;
   configuring, by the manager service, the functional neighboring computing device with the device snapshot;
   sending, by the computing device, an additional validation request to the functional neighboring computing device; and
   revalidating, by the computing device, the network connection to the functional neighboring computing device.

7. The method of claim 1, wherein receiving the validation indication from the neighboring computing device comprises receiving an acknowledgement that the validation request was successfully sent to the neighboring computing device using the second identifier.

8. The method of claim 1, further comprising responsive to the validation indication, sending, by the computing device to the manager service, a further indication that the computing device was successfully installed at the second data center.

9. The method of claim 1, wherein booting the computing device into the test mode comprises booting from a boot volume stored on a smart network interface card connected to the computing device.

10. A computing system, comprising:
    one or more processors; and
    one or more memories storing computer-executable instructions that, when executed by the one or more processors, cause the computing system to:

receive, from a manager service, a network configuration corresponding to a network topology of physical resources in a first data center, the network configuration comprising a first identifier associated with a computing device, a second identifier associated with a neighboring computing device, and information associating the computing device with the neighboring computing device, and the physical resources comprising the computing device and the neighboring computing device;

receiving, from the manager service, an indication;

responsive to the indication from the manager service, configure the computing device for shipping to a second data center;

boot the computing device into a test mode at the second data center;

receive, at the computing device from a server device at the second data center, a new identifier;

verify, using the network configuration, the new identifier by comparing the new identifier with the first identifier;

send, by the computing device, a validation request to the neighboring computing device, the validation request sent according to the second identifier associated with the neighboring computing device; and validate, by the computing device, a network connection to the neighboring computing device based on a response to the validation request, wherein the network connection is characterized by the network configuration.

11. The computing system of claim 10, wherein configuring the computing device for shipping to a second data center comprises:

encrypting, using a second encryption key associated with the neighboring computing device, a second data volume of the neighboring computing device;

storing, in a first data volume of the computing device, the second encryption key;

encrypting, using a first encryption key associated with the computing device, the first data volume of the computing device; and storing the first encryption key at a secure storage volume communicatively connected to the computing device.

12. The computing device of claim 11, wherein the response to the validation request comprises a validation indication received from the neighboring computing device, and wherein the one or more memories store additional instructions that, when executed by the one or more processors, cause the computing system to further:

obtain, in response to the validation indication, the first encryption key from the secure storage volume;

decrypt the first data volume of the computing device;

receive a key request from the neighboring computing device;

obtain, in response to the key request, the second encryption key from the first data volume; and send the second encryption key to the neighboring computing device.

13. The computing system of claim 11, wherein storing the first encryption key at the secure storage volume communicatively connected to the computing device comprises storing the first encryption key at a smart network interface card connected to the computing device.

14. The computing system of claim 11, wherein storing the first encryption key at the secure storage volume communicatively connected to the computing device comprises storing the first encryption key at a hardware security module connected to the computing device.

15. The computing system of claim 10, wherein the one or more memories store additional instructions that, when executed by the one or more processors, cause the computing system to further:

configure the neighboring computing device for shipping to the second data center by at least generating, by the manager service, a device snapshot comprising a software image of the neighboring computing device;

determine, based at least in part on the response to the validation request, that the neighboring computing device is non-functional;

based at least in part on the determination that the neighboring computing device is non-functional, generate, by the manager service, instructions usable to replace the neighboring computing device with a functional neighboring computing device at the second data center;

configure, by the manager service, the functional neighboring computing device with the device snapshot;

send, by the computing device, an additional validation request to the functional neighboring computing device; and revalidate, by the computing device, the network connection to the functional neighboring computing device.

16. The computing device of claim 10, wherein receiving the validation indication from the neighboring computing device comprises receiving an acknowledgement that the validation request was successfully transmitted to the neighboring computing device using the second identifier.

17. The computing device of claim 10, wherein the one or more memories store additional instructions that, when executed by the one or more processors, cause the computing device to further send, to the manager service in response to the validation indication, a further indication that the computing device was successfully installed at the second data center.

18. The computing device of claim 10, wherein booting into the test mode comprises booting from a boot volume stored on a smart network interface card connected to the computing device.

19. A non-transitory computer-readable medium storing computer-executable instructions that, when executed by one or more processors, cause a computing system to:

receive, at a computing device from a manager service, a network configuration corresponding to a network topology of physical resources in a first data center, the network configuration comprising a first identifier associated with the computing device, a second identifier associated with a neighboring computing device, and information associating the computing device with the neighboring computing device, and the physical resources comprising the computing device and the neighboring computing device;

receiving, from the manager service, an indication;

responsive to the indication from the manager service, configure the computing device for shipping to a second data center;

boot the computing device into a test mode at the second data center;

receive, at the computing device from a server device at the second data center, a new identifier;

verify, using the network configuration, the new identifier by comparing the new identifier with the first identifier;

send, by the computing device, a validation request to the neighboring computing device, the validation request sent according to the second identifier associated with the neighboring computing device; and validate, by the computing device, a network connection to the neighboring computing device based on a response to the validation request, wherein the network connection is characterized by the network configuration.

20. The non-transitory computer-readable medium of claim 19, wherein configuring the computing device for shipping to a second data center comprises:

encrypting, using a second encryption key associated with the neighboring computing device, a second data volume of the neighboring computing device;

storing, in a first data volume of the computing device, the second encryption key;

encrypting, using a first encryption key associated with the computing device, the first data volume of the computing device; and storing the first encryption key at a secure storage volume communicatively connected to the computing device.

\* \* \* \* \*